(12) United States Patent
Dehais et al.

(10) Patent No.: US 9,357,204 B2
(45) Date of Patent: May 31, 2016

(54) METHOD FOR CONSTRUCTING IMAGES OF A PAIR OF GLASSES

(71) Applicant: FITTINGBOX, Labege (FR)

(72) Inventors: Christophe Dehais, Toulouse (FR); Khaled Mammou, Thornhill (CA); Ariel Choukroun, Blancs (FR); Sylvain Le Gallou, Baziege (FR)

(73) Assignee: FITTINGBOX, Labege (FR)

( * ) Notice: Subject to any disclaimer, the term of this patent is extended or adjusted under 35 U.S.C. 154(b) by 321 days.

(21) Appl. No.: 13/976,142

(22) PCT Filed: Mar. 19, 2013

(86) PCT No.: PCT/EP2013/055736
§ 371 (c)(1),
(2) Date: Jun. 26, 2013

(87) PCT Pub. No.: WO2013/139814
PCT Pub. Date: Sep. 26, 2013

(65) Prior Publication Data
US 2014/0055570 A1    Feb. 27, 2014

(30) Foreign Application Priority Data
Mar. 19, 2012 (FR) ...................................... 12 52450

(51) Int. Cl.
*H04N 13/02* (2006.01)
*G06T 17/20* (2006.01)
*G06T 7/00* (2006.01)

(52) U.S. Cl.
CPC .......... *H04N 13/0239* (2013.01); *G06T 7/0075* (2013.01); *G06T 17/20* (2013.01); *G06T 2207/10021* (2013.01); *G06T 2207/10024* (2013.01)

(58) Field of Classification Search
CPC ............................ G06T 7/0018; G06T 7/0065
See application file for complete search history.

(56) References Cited

U.S. PATENT DOCUMENTS

| | | | | |
|---|---|---|---|---|
| 6,144,388 A | * | 11/2000 | Bornstein | ............... G06T 11/00 345/629 |
| 2010/0128109 A1 | * | 5/2010 | Banks | ................... G01S 7/4816 348/46 |
| 2010/0295948 A1 | * | 11/2010 | Xie et al. | ....................... 348/175 |
| 2011/0025829 A1 | * | 2/2011 | McNamer | ............ H04N 13/021 348/50 |
| 2011/0044557 A1 | * | 2/2011 | Abraham et al. | ............. 382/275 |

OTHER PUBLICATIONS

Wei Xu and Jane Mulligan, "Performance Evaluation of Color Correction Approaches for Automatic Multi-view Image and Video Stitching", CVPR, Jun. 2010.*
B.J.P. Horn, "Tsai's camera calibration method revisited", 2000.*
Hongying Zhang, Yadong Wu, and Fang Yang, "Ball Detection Based on Color Information and Hough Transform", International Conference on Artificial Intelligence and Computational Intelligence, 2009.*
Tomasz Jurczyk and Barbara Glut, "Metric 3D Surface Mesh Generation Using Delaunay Criteria", ICCS 2006.*

* cited by examiner

*Primary Examiner* — Jamie Atala
*Assistant Examiner* — Ayman Abaza
(74) *Attorney, Agent, or Firm* — Im IP Law PLLC; C. Andrew Im

(57) ABSTRACT

A method for producing dynamic photorealistic 3D models for digitizing a three-dimensional object, that may include including transparent or reflective parts such as a pair of glasses, is adaptive for visualization and real time fitting, and includes movable fastening of the object to a support, pivoting about a vertical axis, placed opposite at least two vertically spaced image shooting devices, acquisition of object images by the image shooting devices during a rotation of the object about the vertical axis, and colorimetric correction of the acquired images.

5 Claims, 8 Drawing Sheets

METHOD FOR CONSTRUCTING IMAGES OF A PAIR OF GLASSES

Figure 1:
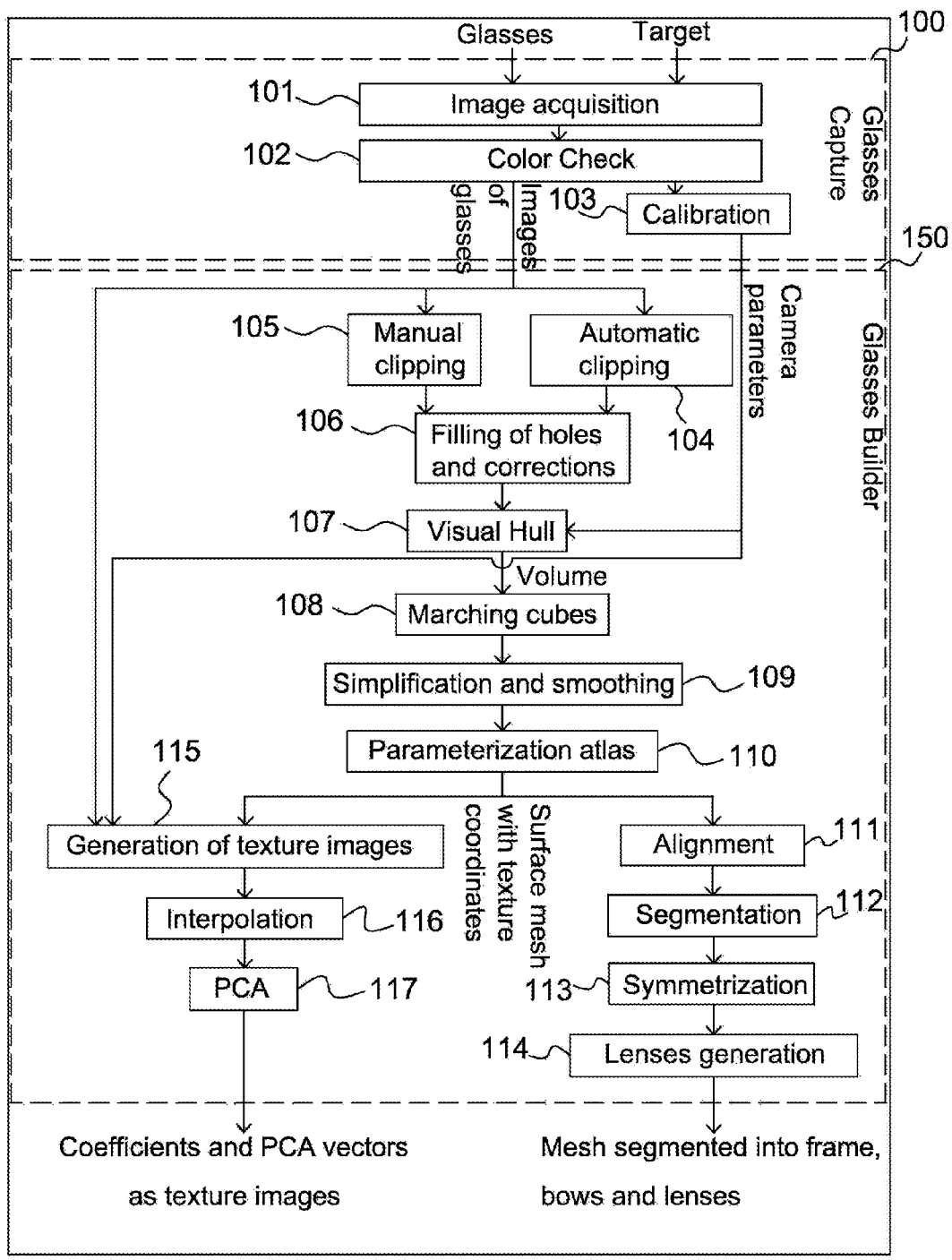

The invention relates to a model and a method for producing dynamic 3D photorealistic models that is adaptive for visualization and real time fitting.

CONTEXT OF THE INVENTION AND PROBLEM RAISED

The context of the invention is that of real time virtual fitting of an object as realistic as possible, these objects being typically but not limited to glasses to be integrated in a photography or a video representing the face of a person substantially in front of the camera.

The growth of internet sales, a limited stock or any other reason that prevents or impedes the real fitting of a real object produces the need for the virtual fitting of this object. The current solutions based on virtual or augmented reality are not sufficient in case of glasses since they lack realism or interactivity. Moreover, they mostly require many data and much time for calculation.

The patent application FR 1050305 of the same applicant, filed on Jan. 18, 2010, is already known in this field.

DISCLOSURE OF THE INVENTION

The aim of the invention is first a method for digitizing a 3D object, said object possibly including transparent or reflecting parts, from 2D views of this object, characterized in that it comprises the following steps:

Movable fastening of the object to a support pivoting about a vertical axis placed opposite at least two vertically spaced image shooting devices;
Acquisition of views of the by the image shooting devices during a rotation of the object about the vertical axis;
Colorimetric correction step for the acquired images.

The colorimetric correction step advantageously comprises:

Obtaining a set of couples real color/recorded color by the image shooting devices,
Establishing a parametric model for the transfer function real color/recorded color using a generic model of non rigid transformation of color space,
the generic model advantageously taking the form of a thin-plate spline.

The invention aims more specifically at a method for digitizing also comprising a geometric calibration step consisting in shooting images of a target with a geometry known by the image shooting devices and the calculation of intrinsic and extrinsic parameters of the cameras of the acquisition machine.

In a particular embodiment, the geometric calibration step uses a structure-from-motion technique and uses a calibration target consisting of colored metallic spheres with a known diameter and maintained at positions adapted to limit the occultation of spheres with each other and to uniformly distribute their positions in the field of view of the cameras, whereby each camera acquires a sequences of images of the target at different orientations obtained by placing the target on a turntable about the vertical axis, whereby the method comprises a step of locating the position of projection of the centers of each colored sphere in a set of images of the calibration target, the calculation based on these positions of the internal parameters and of the positions and orientations of each image shooting device.

The calculation step preferably determines:

3D rigid transformations enabling to express a point in the benchmark of the object in a point in the benchmarks of each camera,
whereby parameters of the projection operation enable to calculate 2D coordinates in the image produced by each camera of a point expressed in the benchmark thereof,
a scaling factor enabling to express the 3D points of the object in a metric benchmark.

In an advantageous embodiment, the geometric calibration step comprises three main steps:

Retrieval of the projections of the 3D centers of the spheres: this step comprises a series of processing operations of the input images leading to the determination of the center of the (assumed) circular imprints of the projections of the spheres, Metric reconstruction of the scene: this step enables an initial reconstruction of the scene (3D points) and of the cameras (internal and external parameters). It requires to determine the elliptical paths of each center of sphere.

Adjustment of bundles: this step enables to refine the parameters found in the preceding step, both internal and external parameters of the cameras and of the positions of the 3D centers of the spheres. To refine these positions together with the parameters of positions and orientations of the cameras and of their internal parameters enables to render the result practically unaffected by the preceding triangulation step. The final precision then depends solely on the localization accuracy of the projections of the 3D centers of the spheres.

The geometric calibration step advantageously comprises:

A preliminary step consisting in determining the distribution of colors of each sphere in an adapted color space (in practice we use the HSV Hue Saturation value space), step in which, considering an image comprising all the spheres and a selections of areas completely covered by the image of each sphere, the characteristics of this distribution of color are determined (for example, if the distribution is assumed to be a Gaussian distribution, the mean value and the standard deviation are sufficient), A step of retrieval of the spheres during which the following steps are repeated for each image and for each sphere:
  i—Classification of the pixels in two classes sphere/background according to the probability of being in the image of the considered sphere,
  ii—Retrieval of the related components in the mask of the sphere class,
  iii—Rejection of the unsatisfactory related components according to their geometric characteristic: elongation value, area,
  iv—On each component that has not been rejected in step iii, retrieval of the contour points in the original image,
  v—Robust and accurate adjustment of a circle on the contour points,
  vi—Retrieval of the center of the circle,
A step of determining the presence or absence of the considered sphere in the image
And, in case the sphere is actually visible in its entirety in the image, obtaining the center of its projection.

The invention aims from another side a method for constructing virtual images of a 3D object from 2D images of this object taken from different angles in at least two directions comprising the following phases:

1. Clipping of at least one part of the acquired 2D images in order to calculate a set of 2D silhouettes of the glasses 500 to reconstruct, 2. Calculation, on the base of the obtained 2D silhouettes, of a volumetric representation of the object 500, 3. Calculation with a surface extraction algorithm of a surface representation of the object 500, 4. Smoothing and simplification of the 3D surface mesh of the object 500.

The method for constructing virtual images advantageously comprises:

A smoothing step adapted to manufactured goods having constant curvatures per piece, A step of dynamic representation of the appearance of an object, A step of photorealistic rendering of an object simulating the appearance variation related to the angle from which the object is viewed.

In a particular embodiment, the clipping uses a filling of the unwanted holes in the 3D volume by exploiting the reprojection of the 3D volume that has been previously clipped in the image to be clipped.

In a particular embodiment, the clipping step uses images as input images that come from previously selected backgrounds, taken by the cameras for a point of view and images of the object from a given angle for the various considered backgrounds and calculates a binary decision mask material/background.

According to a particular embodiment, the clipping step uses a set of backgrounds created according to the following method:

From a set of rules giving values to the parameters (pattern, color, frequency phase), a first background with the pitch size of the display is created, A set of complementary backgrounds, defined with respect to this original background are then generated according to the following rules:

Complementary colors: the complementary background is created by inversion of the color around the neutral color as perceived in the image, Phase shift: a background is proposed with square indent phase shifts in x and y, A background shifted by a half square indent is added, Frequency: several sizes are proposed in order to alternate between the beneficial effects of a high frequency and of low frequencies.

More specifically, for a given image representing a point of view from an angle couple focusing the object at a given distance, the clipping step comprises following steps:

1. Measurement of the noise of the sensor in known areas of the image considered as not containing material:

2. For each of the backgrounds a/ Creation of the difference image, b/ Separation into classes: 1 material, foreground; 0 no material, background, c/ Processing to remove possible noise, 3. Union of the binary decision masks material/background The technique preferably uses a selection of views that promotes the refraction diffraction effects and enables an easy separation of the classes.

The invention aims, still from another side, a method for constructing virtual images in case the object is a pair of glasses comprising following steps, possibly used combined with each other:

A positioning aid step for the pairs of glasses in the field of view,

A step of segmentation of the digital model of glasses in 2 bows and the rest of the frame with definition of the pivot points, A symmetrization step for the models of pairs of glasses A step enabling the semi-automatic reconstruction of glasses lenses using the profile of a 3D path that is itself determined semi-automatically, A step for generation of glasses lenses by parametric approximation that guarantees a constant curvature, A step for computer-aided production of a model of pair of glasses nearest to an existing model.

The clipping method advantageously uses a backlit neutral background to separate the object from the background in the images.

The system presented enables the digitalization of 3D objects.

The produced digital models have different forms:

High quality photographs (high resolution, accuracy of appearance),

Previews of the object on 360°, 3D digital models that can be used in augmented reality systems (for example, virtual fitting applications, virtual worlds etc.).

The system comprises a lighting environment and a set of cameras giving to the above-mentioned representations a crucial photorealistic character in augmented reality applications. The quality of the geometric reconstruction and the metric scaling result in an accurate copy of the object that can be dynamically integrated in a photorealistic augmented reality flow.

The innovating features of the system are:

1) The automatization of the clipping of the object with respect to the background of the shots;

2) The capture of the dynamic appearance of the object;

3) The reproduction (rendering) of the appearance in any view;

4) The automatic reconstruction of the geometry of the object in a standardized benchmark (guarantee of orientation, position and size);

5) The independent modeling of the different parts of the object. In the case of pairs of glasses, the frame and the lenses can be changed individually;

6) The handling of the appearance of an object in order to create a different appearance;

7) The representation of the appearance of the object is compact and supports the quality scalability (ability to enhance the quality level) for the streaming of the object models through different networks;

8) The handling of the geometry of the object in order to make it symmetrical when the real object is supposed to be symmetrical but has defects without distroying the details thereof;

9) A support for the object enabling the acquisition of a pair of glasses with a minimum of artefacts on appearance and geometry and an inclination for the integration for the use as an application, for example, for virtual fitting and augmented reality;

10) A new very accurate multi-camera calibration method;

11) The very accurate reconstruction of the geometry of the object, currently less than one twentieth of a millimeter, and directly connected to the quality of the cameras;

12) In case of glasses as an object, the use of this model for virtual fitting on a video stream or on a photograph of a real person. Thus we claim the metric fitting of the pair of glasses reconstructed on the face that constitutes a real time wearing simulation that is photorealistic when it is coupled to the metrics of the face that wears the glasses. The accuracy of wearing of the virtual glasses is thus less than one millimeter.

The creation of a dynamic 3D model (geometry and appearance) follows four steps:

1) The shooting;
2) The reconstruction of the geometry;

The construction of a model with the appearance of the object as a dynamic texture that can be parameterized as well as of dynamic lighting effects that can be parameterized;

3) The correction of the acquired geometry and appearance in order to eliminate the defects inherent to any 3D digitizing method.

The invention aims at the following elements, possibly implemented with each other:

A 3D reconstruction process from 2D silhouettes enabling to handle reflective transparent glasses;
A clipping correction process combining 2D, 3D, two- and 3D manual, semi-automatic and automatic approaches;
A color correction method for the acquired images;
Supports specifically designed for the maintaining of the pairs of glasses during acquisition that does not impede the quality thereof;
A view acquisition system with a sequence that can be fully parameterized and automatized by a script system;
A positioning aid system for the pairs of glasses in the field of view;
A smoothing technique adapted to the manufactured objects having constant curvatures by piece;
A versatile clipping technique exploiting several approaches depending on their adaptation to the digitized object: manual approach and clipping of the 2D views, clipping manual approach of the generated 3D volume, filling aid approach for the unwanted holes of the 3D volume, approach exploiting the reprojection of the previously clipped 3D volume in the view to be clipped;
A dynamic representation technique of the appearance of an object;
A photorealistic rendering technique of an object simulating the appearance variation related to the angle from which the object is viewed;
An automatic method for the generation of glasses lenses by parametric approximation that guarantees a constant curvature;
A technique enabling the computer-aided manufacturing of a model of a pair of glasses nearest to an existing model (change on appearance only, on material only, on type of lenses only or combination of these changes).

PRESENTATION OF THE FIGURES

The characteristics and advantages of the invention shall be better understood by reference to the following description that sets out the characteristics of the invention by means of a non-restrictive application example.

Figure 2:
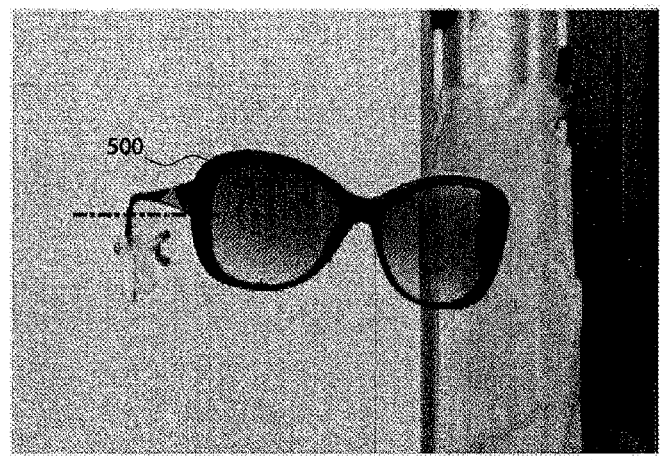
Figure 3:
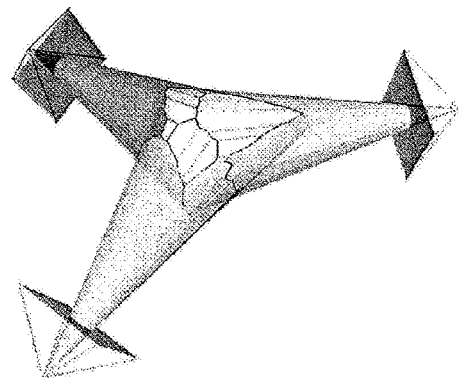
Figure 4:
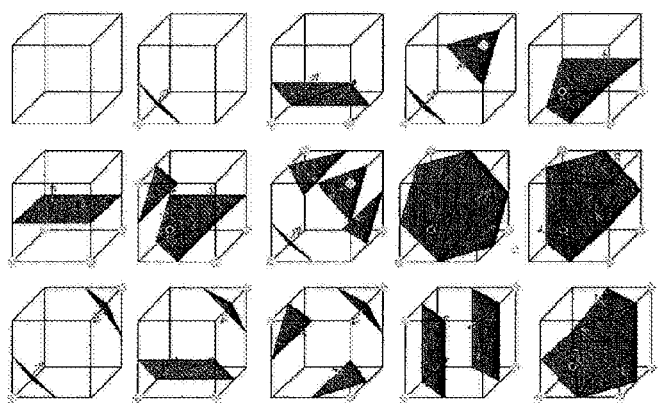
Figure 5:
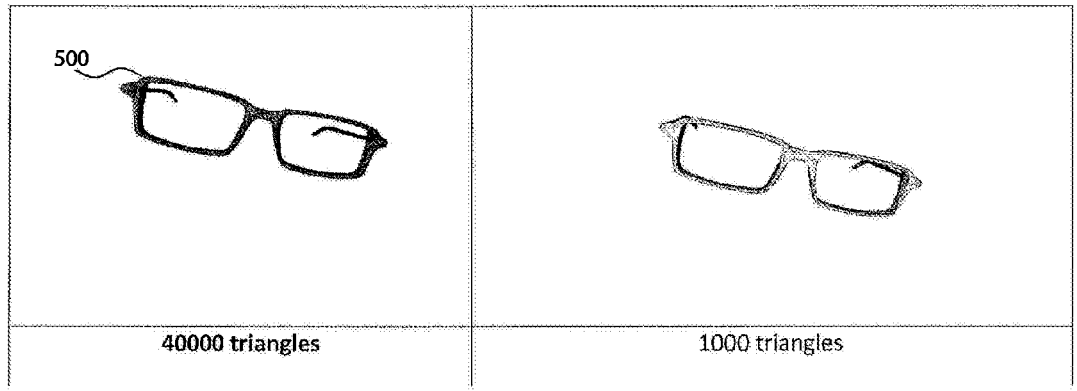
Figure 6:
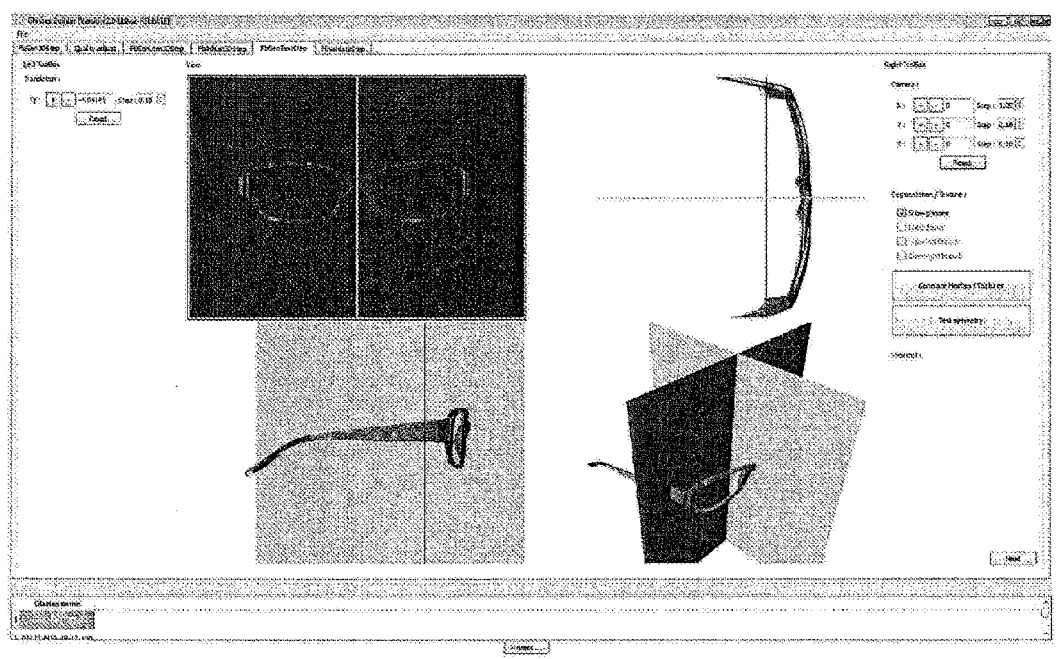
Figure 7:
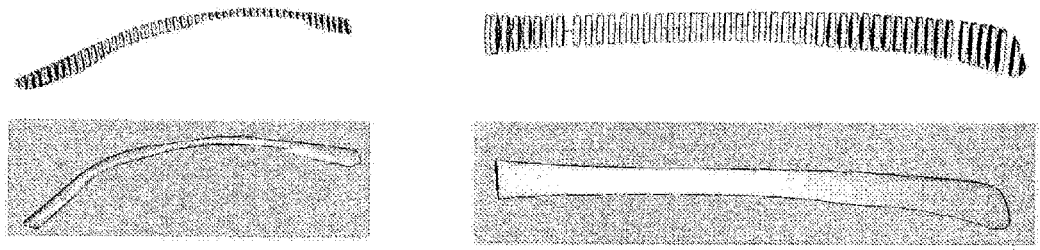
Figure 8:
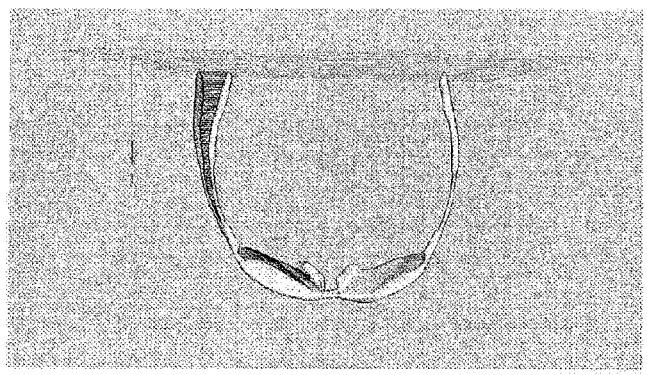
Figure 9:
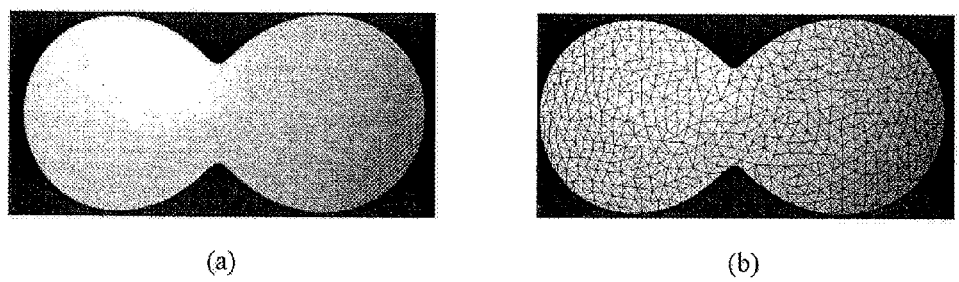
Figure 10:
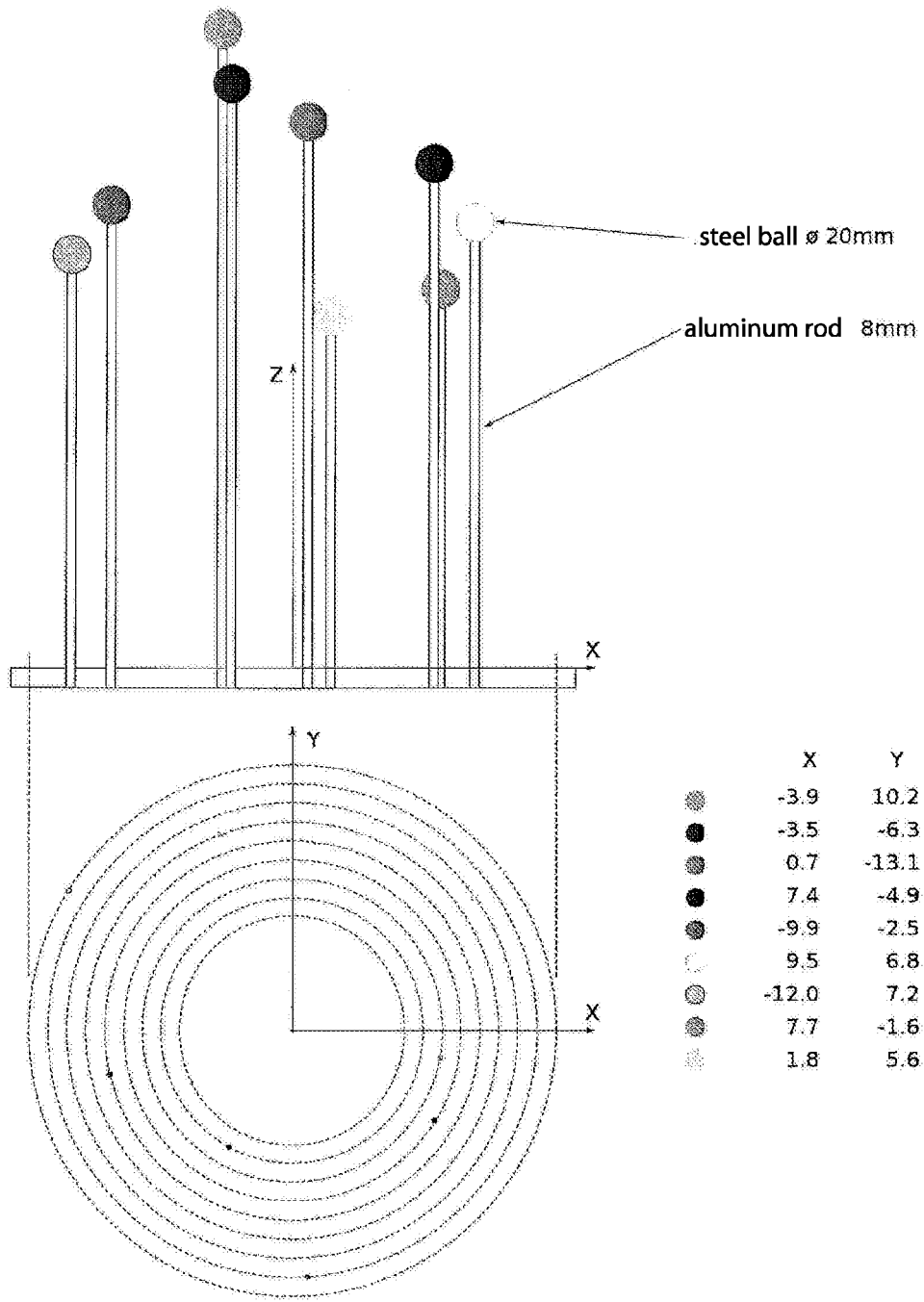
Figure 11:
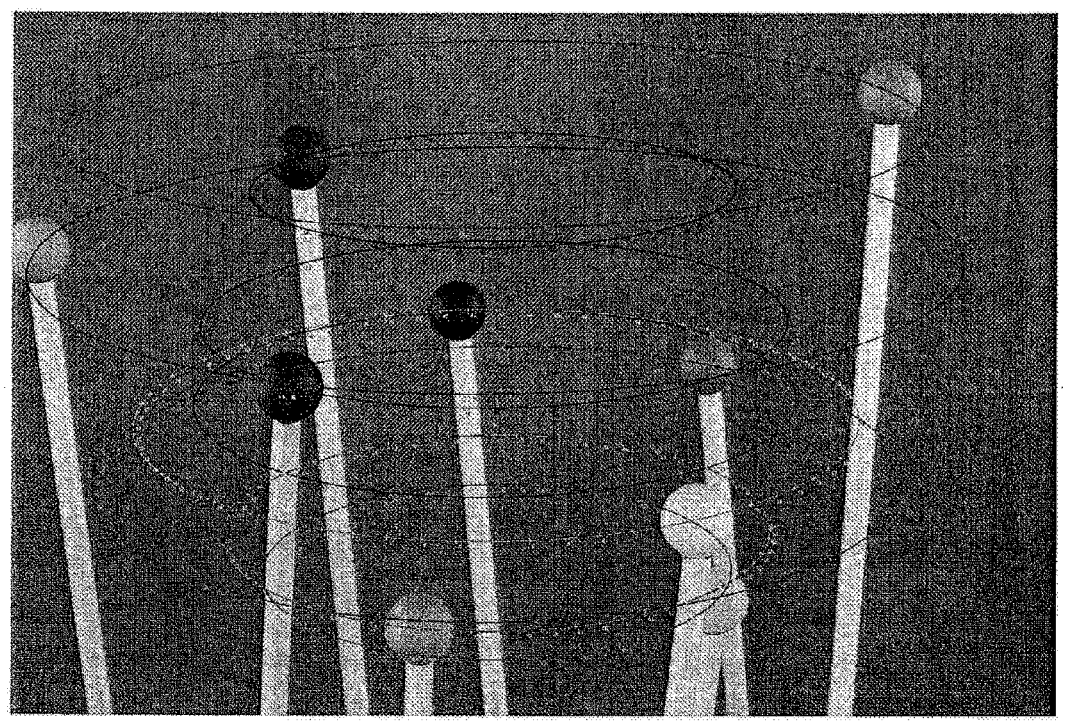
Figure 12:
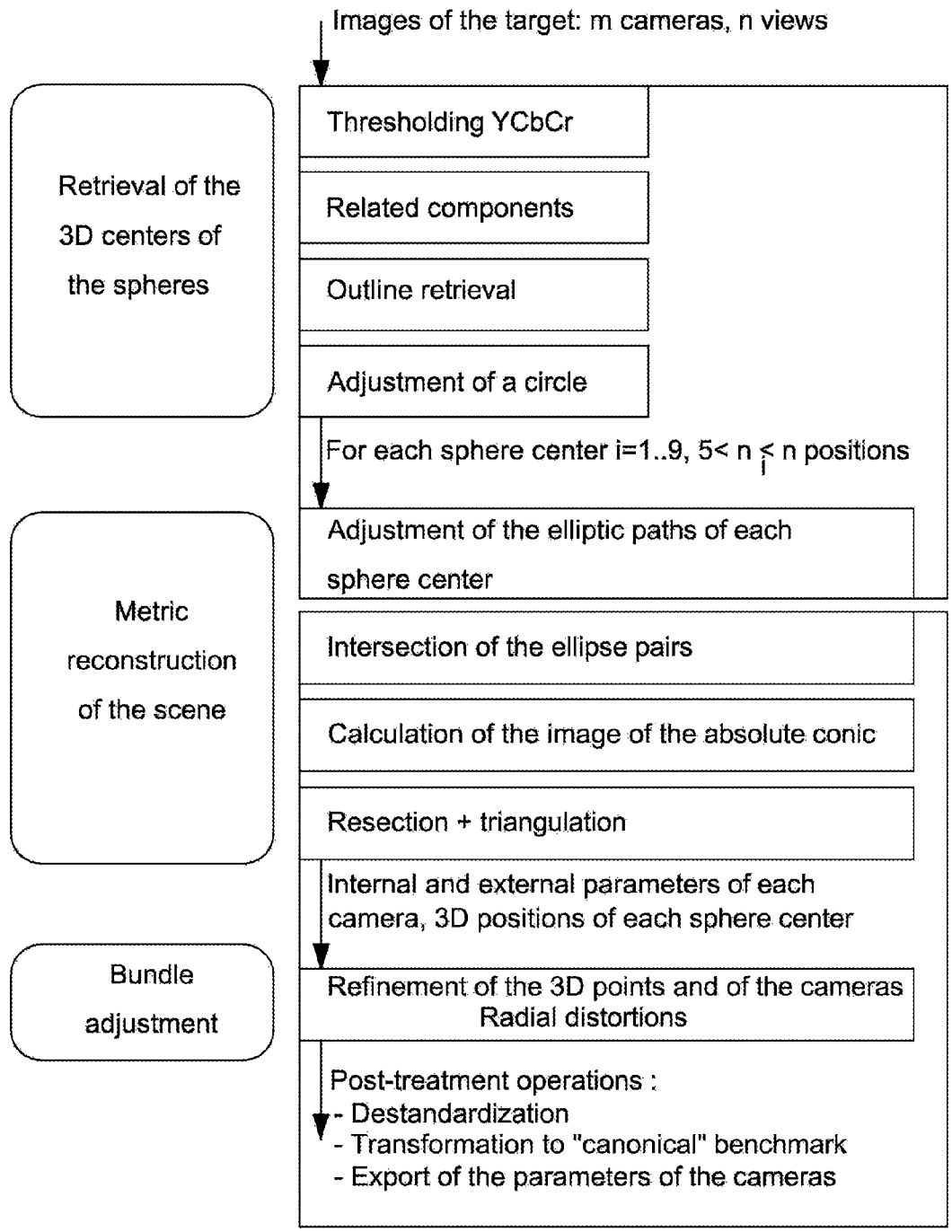
Figure 13:
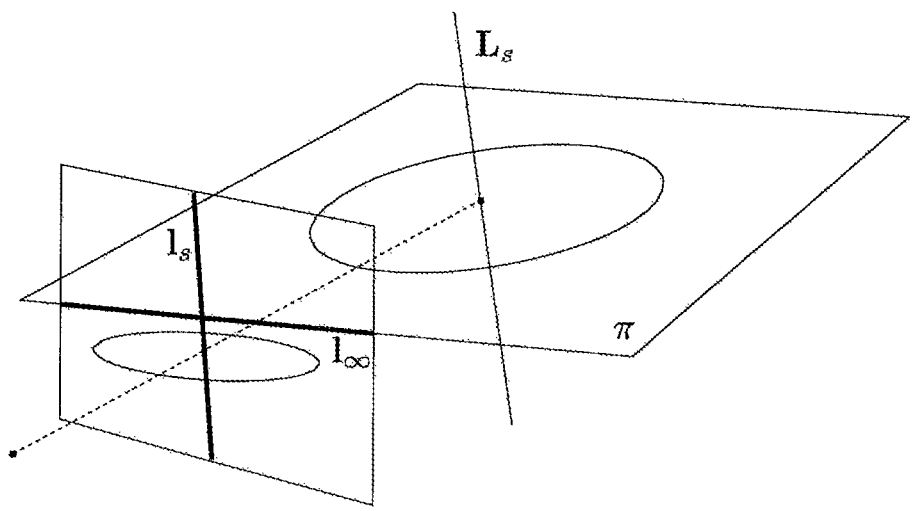

The description is based on the attached figures that represent:

FIG. 1: a block diagram of the glasses generation process,
FIG. 2: image shooting guides,
FIG. 3: an illustration of a visual hull obtained by the analysis of three 2D views,
FIG. 4: configurations defined by the marching cubes algorithm and the corresponding triangulations,
FIG. 5: principle of mesh simplification,
FIG. 6: semi-automatic segmentation interface of the bows,
FIG. 7: retrieval of a skeleton,
FIG. 8: non rigid deformation of the bow,
FIG. 9: reconstruction of a 3D glasses lens,
FIG. 10: target scheme,
FIG. 11: target shooting example and estimated ball trajectories,
FIG. 12: flow diagram for the geometric calibration of the cameras,
FIG. 13: illustration of the fixed elements of the rotation movement of a sphere of a geometric calibration target.

DETAILED DESCRIPTION OF AN EMBODIMENT OF THE INVENTION

FIG. 1 shows the block diagram of an acquisition process 100 (marked "Glasses Capture" in FIG. 1) and of a 3D reconstruction process 150 for glasses 500 (designated by "Glasses Builder" in FIG. 1) in a non-restrictive embodiment example that uses an image shooting machine 50 (also called acquisition machine and not shown in FIG. 1) that is representative for an embodiment of the invention.

Phase 1. Data Acquisition: Machine and Setup

Glasses 500 are positioned in an image shooting machine 50. The glasses 500 are maintained in position by a support for glasses provided for that purpose.

The glasses 500 pivot about an axis Z (FIG. 1). This axis merges here with the normal vertical axis when a user wears glasses. This arrangement is not restrictive and other axes could be chosen. Photographic devices/cameras placed at different heights along this vertical axis Z enable to obtain images of the glasses 500 of different heights. After acquisition, the images of the glasses 500 are transferred to a remote server.

I.A. Step 101. Acquisition of Quality 2D Images for Reconstruction and Visualization 1. Machine The acquisition machine is composed of several subsets:
Support for photographic devices;
Support for glasses and turntable;
Structure for lighting environment and
Lighting equipment.

Several photographic devices (typically half a dozen) are positioned on two vertical rails A and B of the machine. The number of rails and their orientation can differ from this example. The position of the photographic devices can be adjusted according to the needs. The rails can fix a variable number of devices (between 1 and 10 devices) according to the needs.

A turntable is fixed on the rail designated by <<C>> in the figure. This turntable makes it possible to pivot the support of the glasses about the axis Z. In this way, photographs of the glasses 500 can be taken by any of the photographic device from any viewing angle about the vertical axis Z.

An electronic control card with an interface with the PC controls the turntable. The glasses 500 (or more generally the object to be digitized) are positioned in the center of the machine on a support for glasses, which is connected with the turntable. The turntables are easily interchangeable by means of a magnet system.

The support for glasses is surrounded by a lighting environment structure composed of aluminum rails that maintain diffusing Plexiglas (registered mark) panels The diffusing panels serve for diffusing and uniformizing the light coming from the lighting equipment. The lighting environment structure is illuminated by spotlights such as, for example, LED spotlights.

2. Image Shooting

Photo or Reconstruction a) Supports for Glasses Frames

The glasses 500 are maintained in position by a specifically designed support. Various supports for glasses can be used for various types of processing.

The support serving for the shooting of images makes possible:

- To maintain the glasses 500 in a position identical to the position that glasses would have on a real face. In particular, the bows of the glasses are pushed aside so as to reproduce the width created when the glasses are worn;
- To occult the glasses as less as possible;
- To obtain an accurate and adjustable standard positioning of the positioning of the glasses.

In order to be able to conciliate these requirements, the support can be made of 2 or 3 <<arms>> that maintain the glasses 500 in position. In case of a support with three contact points, the glasses 500 are maintained at the end of the two bows as well as on the bridge of the frame. In case of a support with two contact points, the glasses 500 are maintained in position only at the end of the two bows.

3. Support with Two Contact Points

We propose two alternatives: one using the closing force and weight constraint of the glasses 500 and the other one with two clips that fix the position of the bows.

3.1. Support by Closing Force and Weight Constraint

The support comprises for each bow a fastener with two rods between which a bow of the frame is placed. This solution enables to maintain the frame stable without clamping by means of the action of its own weight.

3.2. Support with Clips

The support with clips consists in positioning a clip on each bow. These clips are connected with rods fixed to the turntable and the width of which is adjustable.

4. Support with One Contact Point

In order to use one contact point, we use a system made of nylon threads with which the object is suspended. In this case, the cameras are rotating around the hanging object.

a) Computer-Aided Control of the Supports and Positioning of the Glasses 500

The adjustment of the position of the glasses can be computer-aided:

- The position of the glasses can be visualized in real time with the image shooting software. Image shooting guides (see FIG. 2) are displayed on the video stream in order to help the operator with the positioning of the glasses.
- The mobile parts of the support that are moved when adjusting can be manually moved (for example, by a screw and nut system) or controlled by the computer and moved by a mechanical actuator (for example, servo motor, stepping motor).

b) Image Shooting and Acquisition/Data Transfer

The turntable and the cameras are controlled by dedicated software. Each camera can be controlled independently. The image shooting software contains a script system enabling to perform predefined image shooting scenarios in order to automatize the image shooting task.

5. Automatic Control of the Machine

The system for acquisition of views in sequence is characterized by the fact that it can be fully parameterized and automatized by a script system. A script is a text file comprising a series of simple instructions enabling to sequence the operations of the machine (switching on/off of the different lighting devices, rotation of the turntable, triggering of the cameras, recording of the images on hard disk or sending onto the network).

The image shooting system is also provided with a positioning aid functionality for the pairs of glasses 500 in order to take photographs for direct use. These aids take the form of graphical elements superimposed with the current view of the frame.

I.B. Calibration of the Machine

The 3D reconstruction of the captured object requires the calibration of the image shooting devices. We use a 3D calibration target using a new type of center of sphere that can easily be automatically detected in images.

The accuracy of color acquisition has to be ensured to guarantee a photorealistic representation of the appearance of the object. The method uses a colorimetric calibration target and a new colorimetric correction model enabling to model any correction.

Step 102. Colorimetric Calibration a) Aim

The aim of the system described is the creation of a digital representation of the geometry and of the appearance of the photographed object enabling the reproduction of photorealistic views. It is thus necessary to ensure the accuracy of the colors of the shots. A solution (costly and difficult to implement) consists in using a colorimeter at each capture of the object.

The alternative solution that we use consists in calibrating the image shooting devices by photographing a color target placed at the same location as the object. This target is composed of patches of known colors. Software enables to retrieve the color recorded by the camera from the photograph of this target. The real color and the color recorded in the image are connected by a function that depends on the response of the sensor of the camera and of the processing operations of images that have been performed by the device (including image compression).

b) Modeling and Calculation of the Colorimetric Transformation

The colorimetric target enables to obtain a set of couples real color/recorded color enabling to determine a possible form of the above-mentioned function. The parametric model used can be constructed from a model taking into account the optical and electronic properties of the camera. Another approach, used here as a non-restrictive example, consists in using a generic model of non rigid transformation of the color space R^3. This generic model takes the form of a thin plate spline. The set of couples real color/recorded color enables to determine the parameters of this model by an optimization method in the sense of the least squares method.

Let $c'_i = (r'_i, g'_i, b'_i)$ be the theoretical color of a patch of the colorimetric target. Let $c_i = (r_i, g_i, b_i)$ be the color of the patch measured in a reference image of the target (the considered measure is the mean value of the values of the pixels in a small manually selected area). The transformation model is the following:

$$c'_i = A \cdot c_i + b + \sum_{j=1}^{n} [\varphi(\|c'_i - x_i\|)] \cdot w_i$$

with $\phi(r) = r^2 \log(r)$. We take as check points $x_i = c'_i$.

The matrix A, the vector b and the matrix $W = [w_1 \ldots w_n]$ are estimated by optimizing in the sense of the least squares the deviation between the observed colors transformed by the model and the theoretical colors.

Step 103 Geometric Calibration of the Image Shooting Devices.

The geometric calibration step consists in the acquisition of an object with a known geometry (target). The analysis of this acquisition enables to calculate the intrinsic and the extrinsic parameters of the cameras of the acquisition machine 50.

In order to digitally reproduce the geometry of the object of interest, it is necessary to determine the geometric relation between one point on the surface of the object and its projection in the images produced by the various image shooting devices (camera). The calibration procedure of the devices calculates this relation.

The data produced by the calibration step consist in:
The rigid 3D transformations enabling to express one point in the benchmark of the object in a point in the benchmarks of each camera.
The parameters of the projection operation enabling to calculate the 2D coordinates in the image produced by each camera of one point expressed in the benchmark thereof. These parameters generally take the form of a 3×3 matrix and of a set of parameters describing the optical distortions of the lenses of the cameras.
A scaling factor enabling to express the 3D points of the object in a metric benchmark. Thus the object is reconstructed in its real dimensions and can be used in a consistent manner in augmented reality and measurement applications.

Accurate Multi-Camera Calibration Method

In order to exploit the system object support+cameras as tools for the geometric reconstruction of objects, it is necessary to accurately determine on the one hand the internal parameters of each camera and on the other hand the relative position of the cameras with respect to the support. This calibration step enables to reduce the accuracy requirements during the construction and mounting of the system.

The calibration method uses a structure-from-motion technique and uses a calibration target composed of colored metallic spheres with a precisely known diameter that are maintained at positions so as to limit the occultation of the spheres with each other and to uniformly distribute their positions in the field of view of the cameras.

In the current case, in no way restrictive, we use a target comprising three sets of three different plain color spheres (here: red, green and blue). It is clear that different colors could also be used, namely fluorescent colors. The colors must only be separable by the chosen segmentation method. The number of spheres is not restrictive either.

In order to obtain a more uniform space sampling, the length of the tubes and their implantation on the support (with respect to the axis of rotation Z) are all different.

Compared with the methods based on plane targets or on other 3D targets, this approach is innovating since the 3D centers of the spheres can be localized in a great number of orientations of the target so that the calibration accuracy is enhanced.

The geometric calibration step comprises three main steps (see FIG. 12):
Retrieval of the projections of the 3D centers of the spheres. This step comprises a series of processing operations of the input images leading to the determination of the center of the (assumed) circular imprints of the projections of the spheres;
Metric reconstruction of the scene: this step enables an initial reconstruction of the scene (3D points) and of the cameras (internal and external parameters). It requires to determine the elliptical paths of each center of sphere;
Adjustment of bundles: this step enables to refine the parameters found in the preceding step, both internal and external parameters of the cameras and of the positions of the 3D centers of the spheres. To refine these positions together with the parameters of positions and orientations of the cameras and of their internal parameters enables to render the result practically unaffected by the preceding triangulation step. The final precision then depends solely on the localization accuracy of the projections of the 3D centers of the spheres.

A diagram of the target and an image shooting example are shown in FIGS. 10 and 11.

A first step locates in a set of views of the calibration target the position of the projection of the centers of each colored sphere. A second step exploits these positions in order to calculate precisely the internal parameters and the positions and orientations of each camera.

Image Shooting

Each camera acquires a sequence of images of the target at different orientations obtained by placing the target on a motor driven turntable. The centers of the spheres produce an elliptical movement that is exploited to facilitate their spotting, to detect possible detection errors and to associate each detection to a 3D center of a sphere.

Calculation of the Centers of the Spheres in the Images

Preliminary Calculation of the Color Distribution of the Spheres

A preliminary step consists in determining the color distribution of each sphere in the colorimetric space used (for example HSV). Given an image comprising all the spheres and a selection of areas fully covered by the image of each sphere, the mean value and the standard deviation of each sphere is determined.

Retrieval of the Spheres

Then the following steps are repeated for each image and for each sphere.
1. Classification of the pixels into two classes sphere/background according to the probability of being in the image of the considered sphere;
2. Retrieval of the related components in the mask of the sphere class;
3. Rejection of the unsatisfactory related components according to their geometric characteristic: elongation value, area;
4. On each area validated in step 3, retrieval of the contour points in the original image;
5. Robust and accurate matching of a circle on the contour points;
6. Retrieval of the center of the circle obtained in step 5.

After this sequence of operations the method determines the presence or absence of the considered sphere in the image. In case the sphere is actually visible in its entirety in the image, the center of its projection is obtained with a very low localization error (much lower than 1 pixel);

Detail of the Steps
1. Classification of the pixels. The color (in the colorimetric space used, for example HSV) of the considered sphere is considered to follow a normal distribution with a mean value m and a standard deviation s.
2. Classical
3. Classical. If r=w/h is the elongation value of the related component (w the width, h the height), the component is accepted if rl<r<rh. Typically rl=0.75 and rh=1.3.

4. All the contour retrieval methods can be used, we use a thresholding of the gradient norm and then the Canny method.

5. The adjustment of the circle is performed in two steps: a first step uses the RanSAC parameter estimation technique to obtain (time controlled with a high probability) the most probable circle (containing the highest number of contour points). This technique enables to filter the statistically aberrant contour points. In a second step, the parameters of the circle are adjusted precisely on the remaining contour points according to a method of minimizing the geometric distance. ["*Conic Fitting Using the Geometric Distance*" *Peter Sturm and Pau Gargano. ACCV* 2007].

Rejection of the Falsely Detected Centers by Using a Sequence of Images

In spite of the reliability of the sphere retrieval step, partial occultation of spheres with each other may result in a localization error of certain centers. In order to eliminate these wrong detections, the sequence of images corresponding to the rotation of the target on the turntable is used. The fact that the different theoretical positions of the center of each sphere are localized on an ellipse is used. We thus adjust robustly an ellipse on all the positions obtained in the retrieval step and the statistically aberrant points are rejected. The selection threshold of the statistically valid points is set to the contour localization error.

FIG. 11 shows the detected ellipses for a particular camera and all the positions of the centers that are considered as being sufficiently accurate by the method above.

Adjustment of the Elliptical Paths

At the end of the preceding step, when all the views of a given camera have been processed, three lists of 2D points are obtained, one per set of spheres (per color). In each list there are three elliptical paths that can be successively retrieved with RanSAC. In order to make the calculation of this path more accurate, the points that are detected as inliers for each ellipse are used to re-estimate the ellipse by minimizing the geometric distance [Peter Sturm and Pau Gargano. *Conic fitting using the geometric distance. In Proceedings of the Asian Conference on Computer Vision*, Tokyo, Japan, volume 2, pages 784-795. Springer, 2007]. The final result of this first part is a set of points grouped by ellipse and labeled by the number of the view in which they appear. It should be underlined that this calculation is performed for each camera of the shooting bench.

Metric Reconstruction of the Scene and of the Cameras

Starting from the localization of the projections of the 3D points in the different views, the aim is to reconstruct the 3D scene. By <<scene>> we understand the 3D positions of the centers of the spheres and the parameters of the cameras for each view (position, orientation and internal parameters). For the calibration task in the strict meaning of the term, only the internal parameters of the cameras are necessary. The other parameters can be considered as process derivatives but their fine estimation enables to obtain more accurate results. The term "metric" means here that the reconstruction is obtained with Euclidean transformation accuracy. This has no influence on the internal parameters of the cameras but has an influence on their position.

The method used to individually calibrate each camera of the bench exploits the particular movement of the target (observed in a sequence of images) when it is set rotating on the turntable. The method is adapted from that proposed by par Colombo et al. [Carlo Colombo, Dario Comanducci, and Alberto del Bimbo. *Camera calibration with two arbitrary coaxial circles. In Proceedings of ECCV* 06, pages I: 265-276, 2006] for the reconstruction of surfaces of revolution.

A surface of revolution is obtained by rotating a plane curve about an axis. The sections of such a surface through a plane perpendicular to the axis of rotation are circles. The calibration configuration that we use does not involve any surface of revolution but a rotary movement about a single axis (Single Axis Motion, SAM). A fixed point of the rotating object (here the centers of the spheres of the 3D target) moves along a section of a virtual surface of revolution. Thus both problems—reconstruction of surfaces of revolution and reconstruction of the structure of a rotating object about an axis—can be processed similarly. However, two practical differences exist between the two problems:

The detection of the circular sections is simpler in the case of the rotary movement than in the case of a surface when these sections are largely occulted.

In the case of the rotary movement, there is neither a silhouette nor meridians. These entities are properties that can be exploitable for reconstruction [Carlo Colombo, Alberto Del Bimbo, and Federico Pernici. *Metric* 3d *reconstruction and texture acquisition of surfaces of revolution from a single uncalibrated view. IEEE Transactions on Pattern Analysis and Machine Intelligence,* 27(1): 99-114, 2005].

The method presented here as an example is based on the determination of a certain number of movement invariants in images, more particularly the image ls of the axis of rotation and the image l∞ of the line at infinity common to all the planes perpendicular to the axis of rotation [Andrew W. Fitzgibbon, Geoff Cross, and Andrew Zisserman. *Automatic* 3*d model construction for turn-table sequences.* Pages 155-170, 1998]. FIG. 13 illustrates these different elements. A 3D point rotating about the axis Ls follows a circular path in a plane π. In the image the vanishing line l∞ of this plane and the projection ls of the axis of rotation are invariant.

For the calculation of the parameters of the camera, the technique used is that of the state of the art: maximum likelihood estimation of the different parameters of the problem: 3D position of the spheres, internal parameters (including optical distortions) and external parameters of the cameras.

The Levenberg-Marquart algorithm is used for solving the equations.

Determination of the Metric Scaling Factor.

The 3D reconstruction of the positions of the spheres and of the cameras is obtained (as described here according to the maximum likelihood method) with scaling factor accuracy. The knowledge of real metric dimensions on the target is exploited to obtain a metric reconstruction. These dimensions can be, for example, the distance between the centers of the spheres or the diameter of the spheres. A simple rule of 3 between these dimensions and the (non metric) 3D positions of the spheres recovered by reconstruction enables to obtain the global scaling factor of the scene. The desired metric calibration is obtained by applying this scaling factor to the positions of the cameras.

Constraints on the Image of the Absolute Conic

The absolute conic $\Omega_\infty$ is a conic of the plane at infinity and its image, designated by w, enables to obtain the internal parameters of the camera.

The image of the absolute conic $w = K^T K^{-1}$ depends only on the internal parameters of the camera. The knowledge of w thus enables to obtain K by Cholesky decomposition. In order to estimate w, we use constraints provided by the fixed entities under motion that have been presented above.

First we use constraints provided by images of cyclic points: the constraints are obtained by exploiting the properties of the absolute conic $\Omega_\infty$ and of the circles. The supporting plane π of a circle intersects the plane at infinity $\pi_\infty$ in a line $L_\infty$. This line intersects the absolute conic $\Omega_\infty$ in 2 points that are the cyclic points of the plane $\pi$.

Second we use a constraint provided by the image of the axis of rotation.

Colombo et al. [Carlo Colombo, Dario Comanducci, and Alberto del Bimbo. *Camera calibration with two arbitrary coaxial circles. In Proceedings of ECCV 06*, pages I: 265-276, 2006] show that among these four constraints only three of them are linearly independent. Therefore a pair of circular paths enables to obtain 3 constraints on w so that the camera can be calibrated by assuming square pixels (which is generally the case for most of the modern cameras).

Resection of the Cameras and Triangulation of the 3D Centers of Spheres

An estimation of the camera calibration parameters is obtained in this step. To be able to continue, the positions and orientations of the cameras (a calculation called resection) and the positions of the 3D centers of the spheres (a calculation called triangulation) have to be obtained.

After calibration of the cameras and metric reconstruction of the planes $\pi_K$, it is possible to determine the 3D position of all the centers of the spheres. This calculation is performed for the positions retrieved from the first image for which the benchmark target merges with the benchmark world.

Alternative Method

Another method enabling to obtain an approximate reconstruction of the cameras and of the scene is possible. It is based on an approximate manual measurement of the positions of the 3D spheres.

Refining the Solution by Bundle Adjustment

With the bundle adjustment technique described here it is possible to refine the previously obtained solution. In this step the processing of the radial distortions is added to the projection model. The problem then arises of the least square minimization of a non linear objective function [B. Triggs, P. McLauchlan, R. Hartley, and A. Fitzgibbon. *Bundle adjustment—a modern synthesis*. In B. Triggs, A. Zisserman, and R. Szeliski, editors, *Vision Algorithms: Theory and Practice*, volume 1883 *of Lecture Notes in Computer Science*, Pales 298-372. Springer-Verlag, 2000].

The bundle adjustment consists in finding the parameters of the cameras as well as the positions of the 3D points (the <<scene>>) that minimize the reprojection error of these 3D points.

Phase II. 3D Reconstruction

The acquisition of 3D models of reflective and/or transparent objects (glasses in the current non-restrictive embodiment) is a research problem that has not been solved yet. As a matter of fact, the 3D scanners and the structured light approaches allow for handling only Lambertian objects. Approaches exploiting infrared cameras have recently been proposed Fabrice MERIAUDEAU, Luis Alonzo SANCHEZ SECADES, Gonen EREN, Aytul ERçIL, Frederic TRUCHETET, Olivier AUBRETON, David FOFI, "3-D Scanning of Nonopaque Objects by Means of Imaging Emitted Structured Infrared Patterns", IEEE Transactions on Instrumentation & Measurement, 59 (11), pp. 2898-2906, November 2010 link on HAL and Gonen EREN, Olivier AUBRETON, Fabrice MERIAUDEAU, Luis Alonzo SANCHEZ SECADES, David FOFI, Frederic TRUCHETET, Aytul ERçIL "Scanning From Heating: 3D Shape Estimation of Transparent Objects from Local Surface Heating", Optics Express, 17 (14), pp. 11457-11468, Optical Society of America, 2009. Nevertheless these techniques remain experimental, costly and difficult to implement on an industrial scale.

The proposed system uses an original approach that makes possible to digitize glasses 500 that are totally or partially transparent and/or reflective while avoiding limitations inherent to the classical 3D acquisition systems (for example 3D scanner). The new approach that is proposed combines an approach of reconstruction by 2D silhouettes with constructive approaches of the transparent/reflective parts (for example: lenses and nose pads). The glasses 500 are thus reconstructed in 3D from 2D silhouettes 2D coming from a clipping of the images acquired during image shooting.

The main steps of the 3D reconstruction process are:

1. Clipping of the shots (see section "Acquisition of quality 2D images for reconstruction and visualization") in order to calculate a set of 2D silhouettes of glasses 500 to be reconstructed.

2. The silhouettes obtained are then exploited to calculate a volumetric representation of the glasses 500.

3. A surface extraction algorithm is then applied in order to calculate a surface representation (i.e. 3D surface mesh) of the glasses 500 more adapted to the rendering.

4. The 3D surface mesh of the glasses 500 is then smoothed and simplified so as to generate a representation both compact and with an accurate geometry of the glasses 500.

II.A. Acquisition of the Silhouettes by Clipping

All images or part thereof of the glasses 500 are clipped by automatic or manual methods as explained in detail in the part acquisition of the silhouettes by clipping of this application. The system that is presented here is innovating with respect to the traditional methods since it uses a backlit neutral background to separate the object from the background in the images. The system enables to capture an image in which only the background is fully saturated which makes its detection immediate. Contrary to the approaches that use a green background, this approach is simpler to be implemented and does not introduce any parasite lighting in the scene (the colored backgrounds reflect a colored light onto the object).

Step 104 Automatic Clipping

The clipping of objects in a 2D image is a classical problem and several more or less sophisticated approaches have been developed to deal herewith. In literature this problem is often formulated as a problem of segmentation into two classes: (1) the background and (2) the foreground. A study of the main methods is presented in [10] and [11].

Because of the great number of images to be clipped per pair of glasses 500, we did select a simple and quick automatic approach that uses a thresholding in the RGB space in order to separate the glasses 500 from the background.

Hypothesis: the background is preponderant in the image and has a color close to white.

The algorithm proceeds as follows:

Calculation of the histogram;

Determination of the most probable color C0 that resembles white (i.e., $\|C0-white\|>R0$);

We consider as a background all the pixels that have a color close to C0 (i.e., $\|C-C0\|<R$);

The parameters R and R0 are defined experimentally.

Step 105 Manual Clipping

Because of the transparent and reflective character of the glasses 500, ambiguous cases that are difficult to process automatically are possible. These particular cases are handled by a manual or semi-automatic clipping step.

Step 106 Filling of the Holes and Corrections

An optional clipping refinement step that exploits the surface model that has been obtained can be applied to correct clipping errors. Here several solutions are combined:

Manual clipping of the 2D views;

Manual clipping of the generated 3D volume by the Visual Hull algorithm;

Filling of the holes obtained after clipping errors by a semi-automatic approach that consists in projecting 3D objects (defined by the user) onto a subset of 2D views;

Automatic or semi-automatic clipping of the 2D views by reprojection of the views considered as being correct onto the other views by exploiting the 3D model and the parameters of the camera.

II.B. Reconstruction of the 3D Volume

Step 107 Visual Hull (FIG. 3)

Algorithm described in [1]

The glasses 500 are represented by a full volume.

The volume is created by exploiting the silhouettes of the glasses 500:

Each voxel is projected onto all the views.

If the projection of the voxel corresponds to a pixel of the background on at least one view, the pixel is considered as not belonging to the glasses 500.

Step 108 Marching Cubes (FIG. 4)

Algorithm described in [2]

Aim: conversion of an implicit surface represented by a volume into a triangular surface mesh.

The algorithm triangulates each voxel according to the configurations defined in FIG. 4.

II.C. Simplification and Smoothing (FIG. 5)

Aim: to obtain the most regular and light models.

The meshes obtained by the marching cubes are voluminous and have a voxelized aspect. In order to address these two limitations inherent to the reconstruction process by marching cubes, we iteratively apply two simplification and smoothing steps.

1. Step 109 Simplification

Algorithm described in [3]

Exploit edge contraction operations for performing a mesh decimation.

The sequence of simplification operations to be applied is selected to minimize the mean square error at each stage.

2. Smoothing

We propose a new smoothing approach specifically adapted to manufactured objects with constant curvatures by piece. The main idea consists in an approximation of the neighborhood of each mesh vertex by a parametric surface, which enables to obtain a smooth surface by ensuring an almost constant curvature on each surface patch.

The algorithm proceeds as follows:

The mesh is converted to a closed manifold surface by duplicating singular vertices and by filling the holes.

A bijection between the neighborhood V of each vertex s and the plane is calculated by exploiting the approach [4].

The neighborhood V is approximated by a parametric surface P0 (i.e. bivariate polynomial of degree 2) by minimizing the following linear problem:

$$P_0 = \underset{P}{\operatorname{argmin}} \sum_{i \in V} \|V(u_i, v_i) - P(u_i, v_i)\|^2$$

The new position of the vertex S is calculated as follows:

$$V(v_s, v_s) \leftarrow P_s(v_s, v_s)$$

Phase III. Dynamic Representation of the Appearance

Most of the materials have an appearance that depends in a complex manner on the position of the light sources of the scene and on the angle from which they are observed. To digitally represent this dynamic appearance is a complex problem that we approach by building directly on shots of the object at different points of view.

With respect to a classical approach consisting in the parameterizing of procedure models of materials (for example, by using shader programs), the approach used in this invention enables the automatic capture of the real appearance of the object.

The approach consists in creating a dynamic texture that can be parameterized according to the angle (2 parameters) formed by the boresight axis of the virtual camera makes with the object. This dynamic texture is itself modeled as a linear combination of several textures calculated from source views, for example, by using the principal component analysis technique (step 117).

In other words, the analysis method for the images acquired at different angles enables to texture the 3D model. This representation contains the overall dynamics of the material (diffuse, specular reflection) as well as geometric details that are not represented in the geometric model of the object.

This technique offers three major benefits:

1. By classifying the different textures constituting the dynamic texture by decreasing order of influence on the final appearance, it is possible to select the compromise depending on the target application between the quality of reconstruction of the appearance and the necessary data volume.

2. This technique also enables the progressive streaming of digital content, which makes a quick visualization possible, even at low speed.

3. With this approach, it is possible to separate the lighting effects (specularities) in order to accentuate or eliminate them.

III.A. Construction of the Dynamic Texture

The construction of the dynamic texture is based on a linear approximation of the appearance of the object. A 2D parameterizing of the mesh is calculated to combine the appearance captured in each view (for example, by using the method of [14]). Thus we obtain for each view of the object a texture $T_i \epsilon \Omega \mapsto R^2$, with $\Omega \subset z^2$ the domain of definition of the texture that is adjustable depending on weight and of the desired quality (for example $\Omega=[0,511]\times[0,511]$). The representation using the texture suite $T_i$ is extremely storage consuming. In order to reduce the quantity of information by maintaining an acceptable reconstruction quality of the appearance, a texture base $R=\{M\} \cup \{S_j, j=1, \ldots, B_r\}$, is constructed with $N_r \ll N$. Each texture $T_2$ is then projected in the base:

$$T_i = M + \sum_{j=1}^{N_r} \lambda_j S_j$$

The texture base B can, for example, be constructed by principal component analysis (PCA) of all the vectors $\{t_i\}$ where $t_i$ is the column vector representation of the texture $T_i$.

The appearance model thus comprises:

1. The texture base B

2. A set of couples (aj,bj) used for the quantification of the textures Sj.

3. A matrix $$\Lambda = \begin{bmatrix} \lambda_1^1 & \cdots & \lambda_1^N \\ \vdots & \ddots & \vdots \\ \lambda_{N_r}^1 & \cdots & \lambda_{N_r}^N \end{bmatrix}$$

comprising the coefficients of linear combination enabling to reconstruct an approximation of each texture Ti. Each texture Ti and by extension each vector $(\lambda_1^i, \ldots, \lambda_{N_r}^i)$ are associated to a point of view characterized by two angles $(\theta_i, \phi_i)$.

III.B. Rendering

The rendering of the object is adapted to the current view angle $(\theta, \phi)$ by calculating a vector $(\lambda_1, \ldots, \lambda_{N_r})$. In other words: to define a function $$m: \begin{array}{l} \mathbb{R}^2 \mapsto \mathbb{R}^{N_r} \\ (\theta, \phi) \to (\lambda_1, \ldots, \lambda_{N_r}) \end{array}$$

whose values in the points $(\theta_i, \phi_i)$ are known. Thus, the problem of the calculation of the value $m(\theta, \phi)$ is a simple function interpolation (or approximation) problem that can be solved by any method of the state of the art. We use a method that precalculates the values of the function m on a regular grid of the domain of definition of the angles $(\theta, \phi)$. This method consists in the discrete solving of the differential equations $\Delta m=0$ ($\Delta \cdot$ is the Laplace operator). Then the value $m(\theta, \phi)$ is calculated by bilinear interpolation between the four values nearest to $(\theta, \phi)$ on the grid.

After the vector $(\lambda_1, \ldots, \lambda_{N_r})=m(\theta, \phi)$ corresponding to the current view has been determined, the texture associated to the current view $$T = M + \sum_{j=1}^{N_r} \lambda_j S_j$$

is calculated and applied to the 3D mesh.

Phase IV. Analysis and Improvement

After having been reconstructed and textured, the 3D model can go through a certain number of post-treatments:
- 3D repositioning (i.e. the model is repositioned in space by applying 3D translations/rotations 3D thereon).
- Non rigid deformations such as, for example, a deformation of the bows of a pair of glasses 500 aiming at making the right bow and the left bow symmetrical.
- Insertions/replacements of 3D elements such as, for example, the insertion of lenses into glasses reconstructed without lenses or replacement of the nose pads.

These post-treatment operations can be performed manually or semi-automatically.

IV.A. Geometric

Step 111 Alignment

Aim: Ensure that the glasses 500 are correctly aligned with the axes of the benchmark used for reconstruction.

Two approaches are considered:
- Semi-automatic approach: The user corrects the placing by applying local rotations/translations.
- Automatic approach: Use of a statistical analysis method (for example PCA) for the calculation of the own benchmark.

Step 112—3D Segmentation

The segmentation of 3D objects aiming at segmenting the glasses 500 into a frame and two bows is a still active research problem and several approaches have been developed in the literature [12]. The system proposed exploits a semi-automatic approach (illustrated in FIG. 6) that considers the geometric structure of the glasses 500:
- The user defines the depth of a foreground that separates the pair of glasses 500 into a frame and two bows;
- The bows are then separated by detecting the plane of symmetry.

In an alternative, the segmentation is performed by automatic learning on a few dozen pairs of glasses (for example fifty) by using techniques known per se.

Step 113 3D Symmetrization

The symmetrization of 3D objects is a relatively recent problem [13]. The system proposed exploits an original approach that enables to symmetrize the bows of the glasses 500 by preserving the details. The technique exploits a skeleton extraction method in order to let match the points of the two bows. Then a smooth deformation field is calculated in order to deform a bow so that it fits the symmetrical shape of the other bow.

a) Skeleton extraction

The skeleton of each bow is calculated as follows:
- The bow is transformed in its own benchmark by exploiting a principal component analysis.
- The glasses are decomposed into slices according to the greater variability dimension (FIG. 7),
- The skeletal curve is obtained by connecting the centroids of the slices obtained in the preceding step.

b) Deformation of the bows

Deform the bows of the glasses 500 in order to obtain a symmetrical surface

The algorithm proceeds as follows:
- The skeletal curves associated to the two bows are arclength parameterized and a bijection between the two curves is calculated by exploiting this parameterization.
- The tops of each bow are associated to the nearest points on each curve.
- A field of formation is generated by calculating the differences between the positions of the skeletal curve of the right blow and the curve obtained by symmetry along the plane (O, Y, Z) of the skeletal curve of the left bow.
- The tops of the left blow are moved by exploiting the deformation field in the preceding step (FIG. 8),
- In order to avoid discontinuity problems, the deformation field is weighted according to the distance of the top with respect to the hinge of the bow.

Step 114 Generation of the lenses and integration of the 3D parts into the reconstructed object A semi-automatic approach that exploits a 3D curve as input is applied in order to reconstruct the lenses. The contour is obtained by calculating, for example, the shortest way on the surface of the frame of the glasses 500 that connects the points selected by the user. In the case of glasses 500 without a frame (i.e., rimless), the user defines the contour in 2D. This contour is then positioned in 3D by exploiting the parameters of the cameras calculated in the section related to the calibration of the machine. The user adjusts the depth of the lenses by means of a dedicated graphical interface.

The algorithm for the reconstruction of the lenses enables to approximate the 3D contour by a parametric surface with a constant curvature. The surface is finally triangulated by the Delaunay method. The quality of the triangulation is improved by means of two subdivision and simplification steps.

a) Approximation by parametric surfaces
- The user clicks on a set of points on the frame of the glasses 500 in order to define a lens.
- The shortest way between these points is calculated.
- The curve C is transformed in its own benchmark by exploiting a PCA.
- Parametric coordinates are associated to the points of the contour by projecting them onto the greater variability plane.

A polynomial of degree 2 and with constant main curvatures is calculated as follows (FIG. 9 (*a*)):

$$P_0 = \underset{P}{\operatorname{argmin}} \sum_{i \in V} \|C(u_i, v_i) - P(u_i, v_i)\|^2$$

b) Triangulation of the contour

The contour is triangulated by exploiting a Delaunay triangulation described in [6].

The mesh obtained is subdivided as described in [7].

The positions of the inserted vertices are obtained by exploiting the polynomial P0 calculated in the preceding section.

The mesh obtained is finally simplified by exploiting the algorithm described in the section simplification (FIG. 9 (*b*)).

IV.B. Appearance

The system comprises a set of post treatment operations for the generated data enabling to modify the appearance of the object. These modifications enable the quick production of several similar objects as to their general geometry but different in their appearance (different materials and/or colors, presence absence of detail on surface etc.). This technique is particularly interesting for the frames of glasses, many ranges of glasses being designed as variations of materials and colors of a same pair.

The technique for the representation of the appearance by a texture combination enables to:

Modify (accentuate/diminish) certain light effects by modifying their weights associated to each texture in the combined texture Correct entire regions of the object, for example, for modifying the colorimetry or the luminance thereof.

The independent parametric modeling of the lenses also enables to change their appearance (transparency rate, reflectivity rate, shade etc.). When two pairs of glasses 500 differ in the appearance of the lens, the production of the two digital models is reduced to a simple adjustment of the parameters.

Alternative Embodiment

In an alternative embodiment representing a development of the reconstruction method of a virtual object (namely glasses), it comprises the following steps:

1. Calibration (steps 103)
  a. For a given machine
    i. Geometric calibration
      1. Image shooting of a calibration target
      2. Calibration of all the cameras for the considered positions of the support
    ii. Colorimetric calibration
      1. Image shooting of a colorimetric target
      2. Estimation of the profile of the cameras
2. Acquisition (step 101)
  a. For a given machine
    i. Acquisition of the backgrounds
    ii. Acquisition of the support, material views
  b. Per object
    i. Object acquisition: material views, matting views, texture view with specific lighting
3. 2D preliminary processing
  a. Colorimetric correction of the shots (obligatory texture views) (step 102)
  b. Masks material/background
  c. Matting masks
  d. Optional: support 2D identification, lenses
  e. Automatic/manual detection by clicks of points specific to the object for the positioning and the 3D segmentation.
4. 3D reconstruction
  a. Support 3D reconstruction
    i. Use of the support images and separation background/support
  b. Reconstruction frame without lenses
    i. By using 2D views with some clipped views without support and without lens
    ii. Optional: By 3D subtraction of the support
  c. Reconstruction of the lenses
    i. By deformation of a 3D lens and projection on the matting views
    ii. By automatic/manual 2D clipping of a view and projection of the silhouette onto the surface of the 3D model frames+lenses.
5. Geometric finalization
  a. Segmentation into parts (step 112)
  b. Symmetrization (step 113)
  c. Automatic positioning destined for product use. For glasses, positioning on a generic face model.
  d. Geometric assembly
    i. Lenses, frame, bows and other segmented subparts
6. Texturing
  a. Texturing by using occulting objects: support, reconstructed lenses
    i. Avoid refraction problems
  b. Coloration (inpainting) of the non visible parts because of the support
    i. Generation of support masks by 3D projection in the desired views and mixing with separation in Bayesian classes by learning the support color.
  c. Optional: manual correction by projection of views
  d. Generation of static and dynamic texture
7. Implementation of material
  a. For the lenses
    i. From points that are predefined in the 3D lenses and by projection of these points in the texture desired images, sampling of the colors and replication of the lens shade depending on lens type: eyeglasses, solar, progressive, mirror, polarized etc.
    ii. Subjective adjustment of the reflects and environment depending on the required rendering
  b. For the desired frames
    i. Multi-material segmentation
    ii. Transformation of the desired areas of textures into materials for the materials for which we have a physical model that is considered as being realistic. Setting values for the parameters of the physical models depending on observations by minimization between synthesis and reprojection in the sense of least square minimization. The physical model is decided depending on the declared type of material.

This method is valid for all the objects, which can be virtually fitted, or not.

Advantages of the Method

The system (machine and method as described) forms a scanner that processes the multi-material objects and that is able to perform an accurate photorealistic rendering thereof.

It constitutes a scanner that is able to process transparent objects by diffraction/refraction.

The analysis and rendering technique described uses complementarily the geometry and appearance analysis: where the accuracy of geometry has an end, the texture analysis takes up. The final rendering considers these two aspects, which enables to reproduce an extremely accurate image of the object in any point of view.

The method comprises an original use of background patterns (not projected like strips/patterns on matt objects and non environmental such as strips for the matting calculation for the material reconstruction in passive vision. Semi-active/active inverse method by background screen.

Similarly, the method comprises an original parameterization that enables to reduce the acquisition time with a set of points of view, of algorithms and of sensibly selected backgrounds and makes possible an industrial processing method: [5 backgrounds against one 36 for the known environmental matting technique].

It enables an automatic positioning and segmentation of the object by learning.

The method implements an adaptive/scalable rendering technique (able to extend its quality level) that can display as many effects as desired depending on the graphic platforms and graphical capability.

General Presentation

The techniques to distinguish the material and analyze the 3D shape are nowadays directed more towards active approaches: infrared, ultraviolet, projection of structured light that require expensive systems and that are dedicated to a single type of materials and surface. In the literature about 3D reconstruction 3D by active lighting fringes or structured patterns are used and we look at how they are deformed with respect to what is expected in the image. The document Ihrke, I., Kutulakos, K. N., Lensch, H. P., Macinor, M., & Heidrich, W. (2008). *State of the art in transparent and specular object reconstruction. In EUROGRAPHICS* 2008 *STAR-STATE OF THE ART REPORT* proposes a complete review of all the analysis and rendering techniques. Most of these techniques are time consuming for acquisition and deal only with one type of material or surface when they perform 3D reconstruction. When they are more dedicated to the appearance rendering, they generally deal with only one point of view.

Our method solves these problems. It enables to reconstruct convex multi-material objects and objects with holes because of the joint use of appearance analysis and reconstruction techniques from several points of view. All the types of surface are dealt with. The concave parts are dealt with in a second part by surface analysis techniques such as photometric stereo or by techniques proposed in the cited review. We can thus very accurately reconstruct and faithfully reproduce most of the existing objects.

We propose to tackle these phenomena as a problem from the other side, by difference of a background expected on a screen and what is observed. We call it inverse active approach. The backgrounds can be lines, strips, intersecting lines or chessboards but also weights or circles because we can express them geometrically and projectively. The more the backgrounds contain exploitable information, the less it is necessary to take photos. The analysis techniques to which we refer generally use structured backgrounds and are limited to one point of view.

This is the case of the technique known per se as environment matting [Chuang, Y. Y., Zongker, D. E., Hindorff, J., Curless, B., Salesin, D. H., & Szeliski, R. (2000, July). *Environment matting extensions: Towards higher accuracy and real-time capture. In Proceedings of the 27th annual conference on Computer graphics and interactive techniques* (pp. 121-130). ACM Press/Addison-Wesley Publishing Co], It is also the case of the phase-shift stereo approach [Yamazaki, M., Iwata, S., & Xu, G. (2007). *Dense 3D reconstruction of specular and transparent objects using stereo cameras and phase-shift method. Computer Vision—ACCV* 2007, 570-579].

The works which come nearest to our technique since they use volumes and matting are those of Yamakazi et al. [Yamazaki, S., Mochimaru, M., & Kanade, T. (2006). Inverse volume rendering approach to 3d reconstruction from multiple images. *Computer Vision—ACCV* 2006, 409-418] who propose a unified approach dedicated to the objects requiring a matting calculation for the mixing of the contour such as fur or hair. For the 3D reconstruction, we rely on classical techniques of silhouette-based reconstruction. One of the main issues is then to obtain these silhouettes.

Automatic Clipping and Reconstruction

We distinguish three aspects which give rise to several alternative methods: the analysis material/background, the creation of the masks and the rendering based on the image.

Automatic Clipping (Step 104) by Inverse Semi-Active Method Aim

The aim is to propose material masks, irrespective of the type and properties of the material, transparent, translucent, reflective etc. These masks are used for silhouette-based reconstruction. They shall not exhibit any false negatives. For example, to decide about a hole while it is material on a view will make a hole in the volume according to a visibility cone and the error is difficult to be detected. These masks however may contain more material than necessary as long as they provide information on the contour of the object connected with the point of view.

Our approach consists in using known backgrounds and in detecting material at the locations where what has been observed is different from what has been expected. The approach for implementation is similar to the technique known per se of blue screen matting (measurement of matting in front of a blue screen). The intended goal is however different. Our goal is only to perform an analysis material/no material without looking for the alpha and the color of the foreground as a first step.

After having performed the complete analysis (masks and 3D), it is possible to perform a matting analysis without any risk.

Problems and Analysis

We take the case of glasses as most complex example on objects considered as rigid at the time of image shooting. Our technique applies to all the objects, materials and lighting effects. The glasses are constituted by several types of materials. These materials have photometric properties (often modeled in BRDF, BTF) relating to their physical properties (type and processing operations of the materials): reflective like metal, non isotropic like brushed, absorbing or fluorescent effects (subsurface scattering), like acetate or rubber, transparent and causing light diffraction and refraction like glasses. These materials interact with each other when they are present on the object by their luminous interactions due to their proximity.

When we take a photograph of a matt and opaque material, a background of a different color is sufficient to distinguish the background from the material. If we do not know a priori the color of the object or if the object has several colors, several backgrounds are necessary. The separation limit material (foreground)/background depends on the ability to propose and to distinguish in the final image colors which are not in the object as well as a cutoff for separating these two classes. The decision shall not be based on a single background but on the information collected on all the backgrounds. For a textured object, the same principle of separation by color can be applied.

We now differentiate two categories of effect of the interaction material/light that cause the failure of a solution with plain backgrounds.

1. Reflection: let us take a reflective material such as a polished metal. The color that can be observed in the image of this metal shall mainly contain rays of the lighting environment. For a material with a more or less grazing orientation with respect to the camera, the color observed in the image of the material will be very close to the color of the clipping background.

2. Refraction/diffraction: let us take the case of glass. Refraction raises two problems. In the case of a plain background, diffraction can alter the color of the background for certain selected views and enables to distinguish it but this is not always the case. Refraction often takes place in case of interactions that are internal to the object: a bow of glasses can be visible through the lens but may be seen at a geometrically false location (Fresnel's law). The mask shall create material and holes at wrong locations.

Approach

Only the colorimetric difference criterion is used in the analysis since our technique is based on the analysis of the photographs. We do not impose any geometric or neighborhood constraint like in segmentation (variational or graph-based approaches) because the latter impose constraints on the shape. However the silhouettes have to be the most accurate possible and they often have unforeseeable discontinuities on the contour inherent to the object: tapers, holes, transparence, filigrees and chisels have to be accurately rendered.

We derive from the identified constraints the geometric and colorimetric properties of the proposed backgrounds:

1. Reflections: the reflections of the object have an additive character on the image since they include a set of rays coming from the environment. If we check the environment with one color and one constant lighting heat and if we propose several colors additive with each other in the background at an adequate position, it is then possible to distinguish the reflection on the object from the background itself because the reflection locations will have a different color from what is expected on the image.

2. Refraction: choosing to distinguish the material regardless of its properties intrinsically avoids the problems of diffraction internal to the object. In the example of the bow seen through the lens, since the lens and the bow are both considered as material, it is not possible to create a wrong hole. Let us now take of the lens itself: the light rays coming from the background and going through the lens are deviated by its refractive index. If we consider the problem according to one dimension with a background with different colored strips, it is possible to distinguish the material by the difference of the diffracted colors along a perpendicular direction. The distinguishable size of the material strips found is the width of the strips that are visible from the camera in the plane of the object to be distinguished. Considering the two preponderant dimensions from one point of view, we can then have several background patterns with strips along several axes and at several frequencies. These backgrounds then become filters and it is possible to change frequency, orientation (Fourier) but also phase (wavelets) and color. It is possible to combine these backgrounds in controlled patterns such as a chessboard or random colored backgrounds. The constraint of difference of color visible in the image is important since the pixel associated to a diffracted ray shall be represented by a color sufficiently different from the expected color. Finally, since the diffraction and refraction phenomena may add up in any point of the image, several digital instances of the identified parameters may be present. The joint colors of identified areas of the background (squares of the chessboard or pixels of an arbitrary background) have to be sufficiently different in order to be distinguishable. The nose pads of the glasses, for example, combine many effects due to the light interaction since they are translucent and have a rounded shape and are small with respect to the scene. They thus have complex interactions.

Algorithm

The method supposes the use of known backgrounds. These backgrounds can be explicitly learnt by captures or can be reconstructed by combination of views if there is an occulting object such as the support of the object.

The automatic clipping algorithm is as follows:

Inputs:
Images of the backgrounds taken by the cameras for a point of view: img_bg
Images of the object from a given angle for the various considered backgrounds img_mat Output:
The binary decision mask material/background: GlassesMaskF For a given image representing one point of view, i.e. a couple of angles: theta, phi aiming at the object at a given distance:

1. Measurement of the noise of the sensor ndgTresh on known areas of the image that are considered as not containing material:

$$ndgTresh = \sum_{pixels\ of\ the\ sampling\ area} \|img_{mat} - img_{bg}\|_2^2$$

with $\|\Box\|_2^2$ standard 2 squared on all the channels r,g,b.

The threshold used here represents the background noise due to mechanical and physical imprecisions of the different constituents of the machine: display for the backgrounds, compression of the images, vibrations of the system and of the image shooting devices etc. This threshold can be evaluated on a set of images during the shooting from different angles with the same principle, the considered sampling area being known on the selected images.

2. For each of the backgrounds
a. Creation of the difference image
For a pixel with position (i,j) of the image:

$$difMask(i, j) = \sum_{r,g,b} \|img_{mat(i,j)} - img_{bg(i,j)}\|_2^2$$

b. Separation into classes: 1 for material, foreground, 0 for no material, background.
Si difMask(i,j)>ndgTresh, GlassesMask (i,j)=1; otherwise difMask(i,j)=0;

c. Processing to eliminate possible noise by image processing. A Sel type noise may be observed on the background. It can be eliminated by simple image processing techniques such as aperture. This step is not indispensable.

3. Union of the masks
GlassesMaskU=union_(backgrounds/view){difMask (background/view)}

If the views are appropriately selected, the mask is full, i.e. that it does not contain any unwanted hole. The technique proposed here as a non-restrictive example defends a judicious choice of views which promotes the refraction and diffraction effects and which makes an easy separation of the classes possible. If the extent of the views is not specified, it is possible to obtain a mask that can contain holes or snow (less material or excess of material). We can then use two complementary techniques:

4.a: Filling of the holes (step 106) by image processing

Techniques such as closure enable to spot and fill the holes with a known size. Their precision is within the range of the size of the structuring element, which is calibrated to have the size of the constituting element of the background visible from the camera.

4.b: Creation of a mask of the main related components. Each view is informative of an aspect of the 3D envelope of the object. Thus we propose the following technique: the material mask is a unique component. In the case of glasses, the support, the lenses and the frame are considered as being one single object at this stage. The final mask GlassesMaskF is a white image from which we remove the m greater regions that are considered as background in the image GlassesMaskU. The image obtained is not the full mask since it may contain more material than necessary. However, the silhouette proposed in the image is very accurate because it is not altered by post-treatment operations. In general, the number of views of the object is sufficient so that all the parts are observed and m=2 areas is sufficient. Thus all the potential areas with holes are neither selected nor added in the final mask GlassesMaskF. Coherence analysis techniques of the area can enable to separate the unwanted holes from those that are representative of the geometry and to propose a finer classification. In fact, these holes can be modeled by their particular structure, which is correlated to the background used.

Implementation: Backgrounds Used

We propose to use a screen visible from all the cameras. In practice one single screen is sufficient. This screen is controlled by the computer and synchronized with the image shooting. In practice, in a machine the image shooting is performed according to the following sequence:

1. Per machine (ambient light, position and adjustment of the cameras) or image shooting session:
    a. Geometric calibration (step 103)
    b. Geometric calibration (step 102)
    c. Learning of the backgrounds
        i. Without object: image shooting of the backgrounds only
        ii. With occulting object like the support
2. Acquisition of the object (step 102)
    a. Positioning of the object on the support
    b. For a set of required views=couples (camera, angle turntable):
        i. Automatic positioning of the object in the desired position
        ii. For all the considered backgrounds
            1. Display of the background
            2. Image shooting for the desired cameras
            3. Data transfer. This transfer can take place in parallel.

The backgrounds are parameterized by the pattern, the color, the frequency and the phase:

Pattern: In order to handle the two possible dimensions in the display situated behind the object, the backgrounds are made of squares. The background is called chessboard when the succession of colors is controlled according to a predefined pattern. Otherwise the background is considered as being random. For the chessboard a pattern is decided and it will be repeated on a background surface. A pattern is a rectangle of n squares of different colors.

Color:
    Choice: The choice of colors is made to maximize the difference with the colors of the expected object. Preferably saturated colors are chosen because the display on the shooting screen and the light environment desaturates them naturally. Thus, if we consider grey as a desaturated color, preferably we shall choose colors far from this value, i.e.: red, green, blue, magenta, cyan, yellow, white, black.
    Arrangement: The aim is to maximize the distance between three color values. The aim is to obtain a contrasted effect in order to minimize the desaturation and the mixing during image shooting. A green square arranged near a cyan square can be considered as a rectangle with mixed color.

Frequency: The background spatial frequency is defined by the size of its constituting squares. The smaller the squares are, the more important the accuracy is important. As a matter of fact, if we have only one ground and if the square is of the same color than the material, this part shall be considered as a hole, the maximal error has the size of a square as perceived by the camera. In practice, there is a compromise between the size of the square, the display capacity of the screen and the focusing capacity of the cameras.

Phase: the positioning of the object to be clipped can be found in a particular case of mixing in the image due to digitizing (display, shooting imprecisions and compression). A spatial displacement of the background enables to avoid such problems.

The backgrounds have to abide by these rules from a spatial point of view but also from a temporal point of view. We thus propose several associated backgrounds, which enable completeness in the material analysis, irrespective of the material of the object and of the multiplicity of its colors.

From a set of rules giving values to the parameters above (pattern, color, frequency, phase), a first background with the pitch size of the display screen is created. A set of complementary backgrounds defined with respect to this original background are then generated according to the following rules:

Complementarity of the colors: The complementary background is created by inversion of the color around the neutral color as perceived in the image. The whole image shooting machine is parameterized so as not to be too far from this proposal. In theory any value may be taken. For a given point of the RGB space, if we consider the neutral color cN as point of symmetry, for a value with the color cl the complementary color of which we want to take, we then propose the new value cl'=cN+vec(cl–CN). Thus, for a neutral value cN=(127,127,127) and if the color of the considered square is cl=(0, 0, 255), then its opposite color of equal Euclidian distance around the neutral point shall be cl'=(255, 255, 0). Thus, we ensure, if we have at least two backgrounds, that there is a minimal distance of at least 127 grey levels between the unknown color of the material and the background. In practice, since the colors are desaturated during the image shooting, this scale is reduced but the distance remains very large for the needs.

Phase shift: we propose phase shifts of the size of a square in x and in y so as to ensure a result if the effects of refraction and of close colors are combined. Similarly, a background offset by halt the size of a square is proposed in the set to avoid any ambiguity due to a wrong positioning contingency of the object and of the background and mixing of the colors.

Frequency: several sizes are proposed to alternate between the beneficial effects of a high frequency (small squares) that very adequately handles the refraction and reflection phenomena but that performs a high desaturation and promotes the mixing of unwanted colors and of low frequencies (big squares) that very adequately handle the matt parts of the object because of large ranges of color stable values. The translucent parts are handled alternately by the one or the other of these approaches depending on whether they integrate refraction, diffraction effects, light reflections or not.

In theory, several backgrounds are necessary: at least 8 backgrounds for the chessboards. In practice, 3 to 5 backgrounds are sufficient. The introduction of a priori knowledge of the object enables to reduce this number: in terms of its constituting colors as well as at in terms of its geometry by the control of the image shooting angles to grazing views that promote the diffraction and refraction effects.

As other possible backgrounds, we use plain backgrounds that enable a matting analysis after the material analysis has been performed.

Reproduction of Appearance and Geometry

The calculated masks enable a reconstruction of the geometry of the object. Because of the explicit handling of diffraction, refraction and reflections, the technique that we propose considers the holes inherent to the object where static techniques of plain backgrounds would not be able to distinguish between material transparency and real hole.

The limit of the method is correlated with the size ratio between the object that we want to reconstruct and the accuracy of the sensor. An example is very thin mesh type glasses on a transparent material. Our algorithm proposes a complete material without any hole. The rendering however has to consider this specific character of the pair of glasses. We then use a so-called digital matting technique whose object is precisely to propose transparency cards for a given point of view that consider the expected color of a pixel in which objects of different colors get mixed like a hair whose size in the image is finer than that of the pixel. We can thus obtain for each point of view the material mask, the matting card and the appearance image. Different backgrounds are used for each of these steps.

Digital Matting

The matting calculation technique in front a blue screen (known as blue screen matting) [Smith, A. R., & Blinn, J. F. (1996, August). *Blue screen matting. In Proceedings of the 23rd annual conference on Computer graphics and interactive techniques* (pp. 259-268). ACM] is sufficient to propose a coherent matting card. This technique however does not guarantee the reliability of this card in case of an object backlit by the backgrounds that emit light. Thanks to the knowledge of the material mask performed by our method and to the different environments proposed by our machine, we adapt the conditions for solving the matting equation and integrate constraints of the image shooting scene.

By choosing the areas for which we know that there is not object and the areas for which we are sure that the material is matt like the support, we add constraints on the resolution in order to obtain a matting card faithful to the desired rendering environment.

Thanks to our setup, it is possible to integrate the resolution of an environment if the reproduction of the refraction effects is desired.

Explicit Construction of the Lenses

With the technique described, the lenses can be integrally processed. However, we want to go further by making an explicit reconstruction of these subobjects since they are highly dependent on the image shooting environment. Their explicit reconstruction enables to assign physical and dynamic properties to them that are destined to the rendering engine such as reflection cards etc. Furthermore, certain lens processing techniques such as polarization have an impact on their real appearance within the scope of an image shooting environment. It is thus interesting to be able to fully control the rendering parameters.

1. Once the material and matting card are known, it is possible to obtain a geometric clipping of the shape of the lenses. This can be performed manually but also with active contour approaches that involve statistical constraints on the expected shapes of the lenses ([Foulonneau, A., Charbonnier, P., & Heitz, F. (2003, September). *Geometric shape Odors for region-based active contours. In Image Processing,* 2003. *ICIP* 2003. *Proceedings.* 2003 *International Conference on* (Vol. 3, pp. III-413). IEEE]). This active contour approach or shape learning can be performed in 3D by considering a set of views and by deforming a surface so that the reprojection corresponds to the views or in 2D on a known set of views that served for learning the shape. From these contours, a 3D adjustment-based construction method that we describe below hat then to be used because it requires in practice only one view per lens and because it is very quick:

Algorithm for quick lens creation:
1. Reconstruction of the material glasses+lenses
2. From a clipped view and knowing the camera parameters
   a. Projection of the silhouette of the lens onto the 3D surface
   b. Adjustment of a surface of degree 2 on the 3D object
   c. Cutting of the adjusted surface according to the projected silhouette
   d. Extrusion in order to obtain the desired thickness of the lens.

Appearance Analysis and Reproduction: Static Texture+ Adaptable Model

For a set of views, we have the material card, the matting card and the texture image in the desired light conditions.

The aim is to obtain a faithful appearance. We propose two approaches.
1. The texturing of the object by using the most relevant views.
2. The creation of a dynamic texture depending on the point of view, by learning the variance of the alpha RGB components between the images.

Both approaches handle the possible occultation of the object itself or of the image shooting support.

We propose a tool for editing and correcting that enables to generate points of view and to integrate the modifications made on these points of view.

Construction of the Diffuse Color of the Object

From a set of views of the object and of the geometric model repositioned in each image, we construct a texture (image) representative of the diffuse color (independent from the view of the object). A 2D parameterization of the surface of the object is necessary, a technique of obtaining is the iso-charts technique [Kun Zhou et al. *"Iso-charts: stretch-driven mesh Parameterization using spectral analysis"*. Proceedings of the 2004 Eurographics/ACM SIGGRAPH symposium on Geometry processing].

The construction approach consists in calculating for each view that is used:
- A texture dependent on the view according to the 2D parameterization of the surface. This texture is incomplete since it considers the hidden parts of the object.
- A card of a quality criterion of each sample (texel) of the texture above. Several criteria can be used; we use the scalar product between the vector connecting the center of the camera with the surface point corresponding to the fragment and the surface normal in this point.

Model of Progressive Appearance and Complexity

On the base of the diffuse texture previously constructed, various models of variable appearance and complexity can be constructed. The data transfer, calculation and memory capacities of the target visualization terminal can be adapted to. The diffuse texture obtained according to the method described above enables (according to the classical synthetic imaging methods) to obtain for each pixel of the image one diffuse color that can be modified in various ways:

- By adding one term characterizing the interaction light/material in the corresponding point of the surface. The Blinn-Phong equations can, for example, be used [James F. Blinn (1977). *"Models of light reflection for computer synthesized Pictures"*. Proc. 4th annual conference on computer graphics and interactive techniques] or any model of bidirectional radiance distribution function BRDF.
- By compositions with other textures representing the variations depending on the point of view. A possible technique is that presented below. This technique is that described in the first part of this description with the PCA textures.

Positioning and Geometric Segmentation by Learning

The positioning of the support points has no image index or index for geometry. Their position however is stable and constrained and it is possible to do a statistical learning on the probability of their position. For glasses, the nose pads and time points for the bows are useful. We describe here how we adapt the 3D object glasses to a virtual face to place them in an augmented reality frame.

3D Repositioning

In order to perform a virtual fitting of 3D reconstructed frames, it can be interesting to reposition these frames in space on a 3D face model (avatar).

For this purpose, a 3D fitting is calculated. The matter is to look for the best 3D translation and rotation enabling to displace a set of 3D points belonging to the frame to corresponding points on the avatar. For example, 3D points situated at nose pad level of the frame have to be found again on the high part of the nose of the avatar.

In practice, a minimization of the function $$f = \sum_p \left[ [W_p(x)]_p - [(Ry)]_p + T) \right]$$

is performed by the least square method where T (3D translation vector [3*1]) and R (3D rotation of the matrix [3*3]) are the sought parameters, p is the index of the 3D point 3D, $x_p$ corresponds to the 3D coordinates of the 3D $p^{th}$ point belonging to the avatar, $y_p$ corresponds to the 3D coordinates of the 3D $p^{th}$ belonging to the frame and $W_p$ is a weight matrix enabling to give an order of importance on the considered 3D points.

An initialization of the sought parameters can be calculated to ensure convergence.

The singular value decomposition (SVD) enables to simply initialize the 3D rotation 3D (R). The matter is first to find the isobarycentres ($G_m$ and $G_a$) of the 2 sets of points $P_m$ (points belonging to the frame) and $P_a$ (points belonging to the avatar) and to then perform a singular value decomposition of the matrix $$H = \sum_i (Pm_i - Gm)(Pa_i - Ga)^T :$$

[U,S,V]=SVD(H). The initialization of the rotation is then $R_0 = VU^T$ and the initial translation $T_0 = G_a - (R_0 * G_m)$.

This 3D repositioning can be performed without any action of a user thanks to the automatic identification of particular 3D points on the mesh of the frame (for example, points on the nose pads, on the bows . . . ).

The automatic identification can be performed in several ways:

- The reconstruction of the support of the pair of glasses can be used to give the 3D position of the characteristic contact points.
- Particular 2D points can be detected by classical image processing methods on the acquired images. They can be particular markings applied on the frame or remarkable points (nose pads, hinges . . . ) detectable by segmentation or classification (2D descriptors). The 3D position of these points identified on the 2D images may then be deduced from the calibration of the acquisition system and of the 3D reconstruction 3D of the frame.
- Weak classifiers of LDA, SVM and Perceptron type can be constructed and drawn onto 3D descriptors to meet simple and particular characteristics of the frame (bottom of the nose pad, bridge, hinge, bow end for example). A fine segmentation of the frame may even be deduced from the information fusion of these weak classifiers.
- The 3D points can be given by statistical learning (with PCA for example) on a base of frame meshes the interesting points of which have preliminarily be annotated by an expert.

REFERENCES

[1] A. Laurentini (February 1994). "The visual hull concept for silhouette-based image understanding". IEEE Trans. Pattern Analysis and Machine Intelligence. Pages 150-162.

[2] William E. Lorensen, Harvey E. Cline: Marching Cubes: A high resolution 3D surface construction algorithm. In: Computer Graphics, Vol. 21, Nr. 4, July 1987.

[3] M. Garland and P. Heckbert. Surface Simplification Using Quadric Error Metrics. In Proceedings of SIGGRAPH 97.

[4] Michael S. Floater, "Mean value coordinates", Journal Computer Aided Geometric Design, Volume 20 Issue 1, March 2003.

[5] Kun Zhou, John Synder, Baining Guo, and Heung-Yeung Shum, "Iso-charts: Stretch-driven Mesh Parameterization using Spectral Analysis", Proceedings of the 2004 Eurographics/ACM SIGGRAPH symposium on Geometry processing, 2004.

[6] Chew, L. Paul (1987). "Constrained Delaunay Triangulations". Proceedings of the Third Annual Symposium on Computational Geometry.

[7] Charles Loop: Smooth Subdivision Surfaces Based on Triangles, M. S. Mathematics thesis, University of Utah, 1987.

[8] Fabrice MERIAUDEAU, Luis Alonzo SANCHEZ SECADES, Gonen EREN, Aytul ERçIL, Frederic TRUCHETET, Olivier AUBRETON, David FOFI, "3-D Scanning of Nonopaque Objects by Means of Imaging Emitted Structured Infrared Patterns", IEEE Transactions on Instrumentation & Measurement, 59 (11), pp. 2898-2906, November 2010 link on HAL.

[9] Gonen EREN, Olivier AUBRETON, Fabrice MERIAUDEAU, Luis Alonzo SANCHEZ SECADES, David FOFI, Frédéric TRUCHETET, Aytul ERÇIL "Scanning From Heating: 3D Shape Estimation of Transparent Objects from Local Surface Heating", Optics Express, 17 (14), pp. 11457-11468, Optical Society of America, 2009.

[10] Nikhil R Pal, Sankar K Pal, A review on image segmentation techniques, Pattern Recognition, 1993.

[11] Sagarmay Deb, Overview of image segmentation techniques and searching for future directions of research in content-based image retrieval, 2008 First IEEE International Conference on UbiMedia Computing (2008).

[12] Ariel Shamir, A survey on Mesh Segmentation Techniques, Computer Graphics Forum Volume 27, Issue 6, pages 1539-1556, September 2008.

[13] Niloy J. Mitra, Leonidas Guibas, Mark Pauly, Symmetrization, ACM Transactions on Graphics (SIGGRAPH), 26(3), 1-8, 2007.

The invention claimed is:

1. A method for constructing images of a pair of glasses, comprising:
   creating a digital model of the pair of glasses by
   a positioning aid step for the pair of glasses in a field of view including movable fastening of the pair of glasses to a support pivoting about a vertical axis placed opposite at least two vertically spaced image shooting devices;
   acquisition of 2D images of 2D views of the pair of glasses by the image shooting devices during a rotation of the pair of glasses about the vertical axis;
   colorimetric correction of the acquired 2D images of the pair of glasses;
   clipping of at least one part of the acquired 2D images in order to calculate a set of 2D silhouettes of the pair of glasses to be reconstructed;
   calculation, based of the obtained 2D silhouettes, of a volumetric representation of the pair of glasses;
   calculation with a surface extraction algorithm of a surface representation of the pair of glasses;
   smoothing and simplification of a 3D surface mesh of the pair of glasses; and
   a step of segmentation of the digital model of the pair of glasses in 2 bows and a rest of a frame with definition of pivot points.

2. A method for constructing images of a pair of glasses, comprising:
   creating a digital model of the pair of glasses by
   a positioning aid step for the pair of glasses in a field of view including movable fastening of the pair of glasses to a support pivoting about a vertical axis placed opposite at least two vertically spaced image shooting devices;
   acquisition of 2D images of 2D views of the pair of glasses by the image shooting devices during a rotation of the pair of glasses about the vertical axis;
   colorimetric correction of the acquired 2D images of the pair of glasses;
   clipping of at least one part of the acquired 2D images in order to calculate a set of 2D silhouettes of the pair of glasses to be reconstructed;
   calculation, based of the obtained 2D silhouettes, of a volumetric representation of the pair of glasses;
   calculation with a surface extraction algorithm of a surface representation of the pair of glasses;
   smoothing and simplification of a 3D surface mesh of the pair of glasses; and
   a symmetrization step for the digital model of the pair of glasses.

3. The method according to claim 1, further comprising:
   a semi-automatic step of forming a profile of a three-dimensional path; and
   a step enabling semi-automatic reconstruction of a glasses lens of the pair of glasses using a profile of a three-dimensional path that is itself determined semi-automatically.

4. The method according to claim 1,
   further comprising a step of generating glasses lenses, of the pair of glasses, by parametric approximation that guarantees a constant curvature.

5. A method for constructing images of a pair of glasses, comprising:
   creating a digital model of the pair of glasses by
   a positioning aid step for the pair of glasses in a field of view including movable fastening of the pair of glasses to a support pivoting about a vertical axis placed opposite at least two vertically spaced image shooting devices;
   acquisition of 2D images of 2D views of the pair of glasses by the image shooting devices during a rotation of the pair of glasses about the vertical axis;
   colorimetric correction of the acquired 2D images of the pair of glasses;
   clipping of at least one part of the acquired 2D images in order to calculate a set of 2D silhouettes of the pair of glasses to be reconstructed;
   calculation, based of the obtained 2D silhouettes, of a volumetric representation of the pair of glasses;
   calculation with a surface extraction algorithm of a surface representation of the pair of glasses;
   smoothing and simplification of a 3D surface mesh of the pair of glasses; and
   a step of computer-aided production of a model of a pair of glasses nearest to an existing model.

* * * * *